United States Patent
Drehmel et al.

(10) Patent No.: US 6,557,069 B1
(45) Date of Patent: Apr. 29, 2003

(54) PROCESSOR-MEMORY BUS ARCHITECTURE FOR SUPPORTING MULTIPLE PROCESSORS

(75) Inventors: Robert Allen Drehmel, Goodhue, MN (US); Kent Harold Haselhorst, Byron, MN (US); Russell Dean Hoover, Rochester, MN (US); James Anthony Marcella, Rochester, MN (US); George Wayne Nation, Eyota, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,189

(22) Filed: Nov. 12, 1999

(51) Int. Cl.[7] ............................................... G06F 13/00
(52) U.S. Cl. ........................ 710/307; 710/107; 709/253
(58) Field of Search ................................. 710/100, 107, 710/113, 307; 370/401, 400; 709/200, 253

(56) References Cited

U.S. PATENT DOCUMENTS

| | | |
|---|---|---|
| 4,644,532 A | 2/1987 | George et al. ................. 370/94 |
| 4,667,305 A | 5/1987 | Dill et al. |
| 4,747,100 A | 5/1988 | Roach et al. ................. 370/86 |
| 4,864,563 A | 9/1989 | Pavey et al. ................. 370/94.1 |
| 5,228,134 A | 7/1993 | MacWilliams et al. |
| 5,355,467 A | 10/1994 | MacWilliams et al. |
| 5,408,646 A | 4/1995 | Olnowich et al. |
| 5,537,394 A | 7/1996 | Abe et al. ..................... 370/17 |
| 5,544,342 A | 8/1996 | Dean |
| 5,553,266 A | 9/1996 | Metzger et al. |
| 5,557,266 A | 9/1996 | Calvignac et al. ..... 340/825.02 |
| 5,604,735 A | 2/1997 | Levinson et al. ........... 370/360 |
| 5,630,095 A | 5/1997 | Snyder |
| 5,659,710 A | 8/1997 | Sherman et al. |
| 5,787,083 A | 7/1998 | Iwamoto et al. ............. 370/389 |
| 5,802,054 A | 9/1998 | Bellenger .................... 370/401 |
| 5,802,565 A | 9/1998 | McBride et al. ............. 711/125 |
| 5,805,798 A | 9/1998 | Kearns et al. |
| 5,848,145 A | 12/1998 | Gallagher et al. ........... 379/220 |
| 5,884,036 A | 3/1999 | Haley |
| 5,893,921 A | 4/1999 | Bucher et al. ............... 711/146 |
| 5,900,017 A | 5/1999 | Genduso et al. ............. 711/146 |
| 5,901,294 A | 5/1999 | Tran et al. |
| 5,911,052 A | 6/1999 | Singhal et al. |
| 5,913,044 A | 6/1999 | Tran et al. |
| 5,923,893 A | 7/1999 | Moyer et al. |

*Primary Examiner*—Glenn A Auve
(74) *Attorney, Agent, or Firm*—Roy W. Truelson

(57) ABSTRACT

An internal processor/memory bus contains an address portion for transmitting addresses and commands, having a series of hierarchical uni-directional links between processors and local repeaters (ARPs), and between the ARPs and a central repeater (ASW). A command propagates from a requesting device to its local ARP, to the ASW. From the ASW, the command is broadcast to all devices on the bus by transmitting to all ARPs or directly attached memory, and from the ARPs to the devices. Preferably, the ASW globally arbitrates the address bus, and all commands propagate at pre-defined clock cycles through the bus. Preferably, each device on the bus independently signals a response via a separate response link running directly to a global collector, which collects all responses and broadcasts a single system-wide response back to the devices. In the preferred embodiment, addresses/commands and data are transmitted on essentially separate paths having different topologies, and at different times, and are arbitrated separately. The data portion of the network comprises a set of bi-directional links from the processors to a local data switch unit (DSW). The local DSW is further linked directly to memory via bi-directional links. No address is transmitted with the data; rather, a tag is transmitted which identifies the original command.

15 Claims, 39 Drawing Sheets

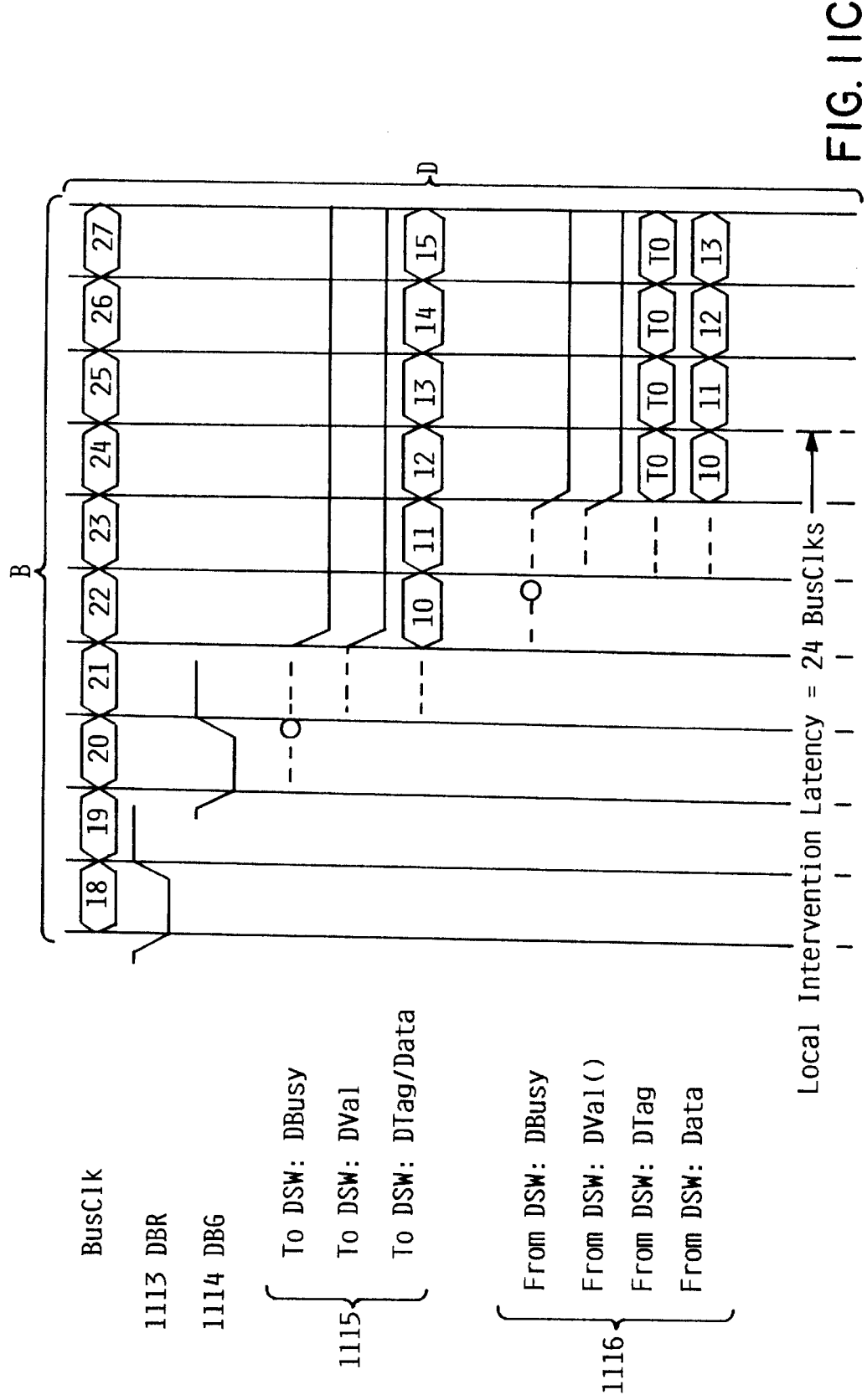
FIG. IIC

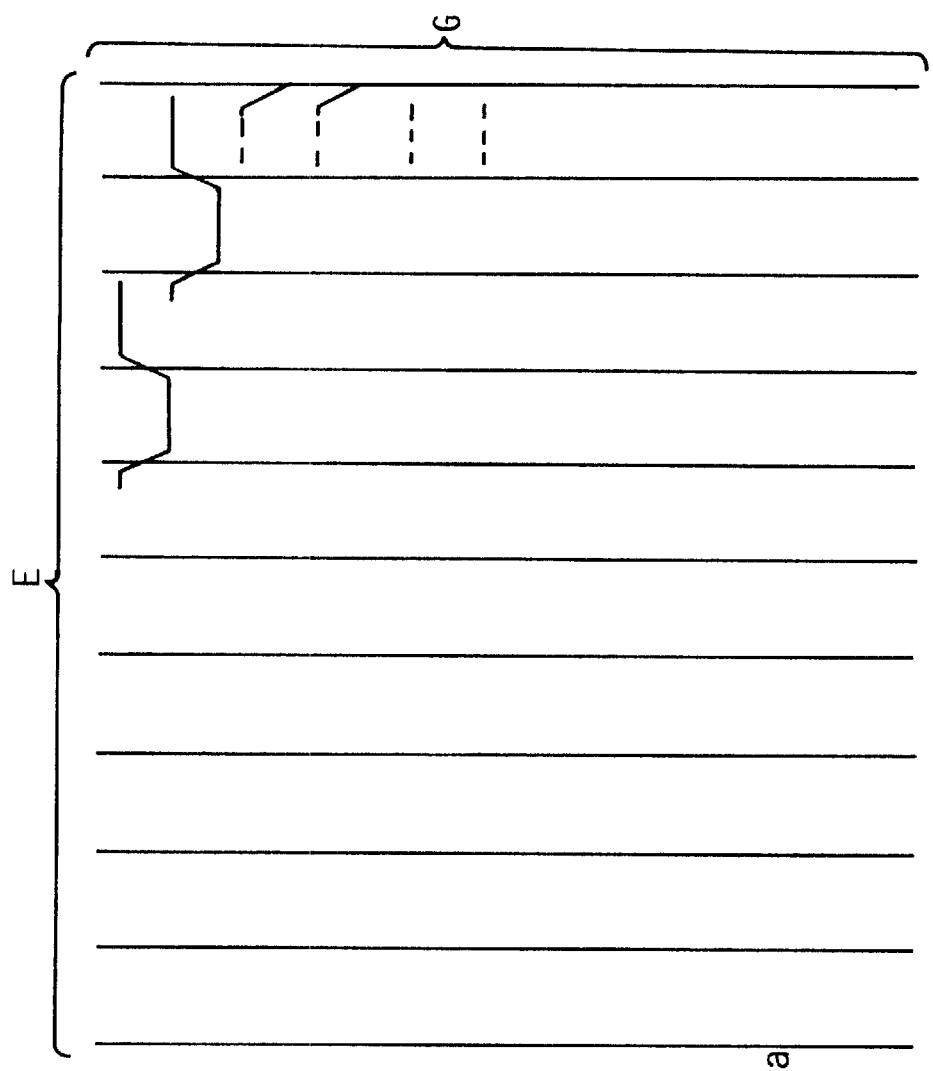

PROCESSOR-MEMORY BUS ARCHITECTURE FOR SUPPORTING MULTIPLE PROCESSORS

CROSS-REFERENCE TO RELATED APPLICATIONS

The present application is related to the following commonly assigned co-pending applications, filed on the same date as the present application, which are herein incorporated by reference:

Ser. No. 09/439,068, to Robert A. Drehmel, et al., entitled "Bus Architecture Employing Varying Width Uni-Directional Command Bus"; and Ser. No. 09/439,586, to H. Lee Blackmon, et al., entitled "Data Routing Using Status-Response Signals".

FIELD OF THE INVENTION

The present invention relates to digital data processing, and in particular to the design of high-speed communication buses for linking processors, memory and other components of a computer system.

BACKGROUND OF THE INVENTION

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of circuits, and by various other techniques. However, designers can see that physical size reductions can not continue indefinitely, and there are limits to their ability to continue to increase clock speeds of processors. Attention has therefore been directed to other approaches for further improvements in overall speed of the computer system.

Without changing the clock speed, it is possible to improve system throughput by using multiple processors. The modest cost of individual processors packaged on integrated circuit chips has made this approach practical. However, one does not simply double a system's throughput by going from one processor to two. The introduction of multiple processors to a system creates numerous architectural problems. For example, the multiple processors will typically share the same main memory (although each processor may have its own cache). It is therefore necessary to devise mechanisms that avoid memory access conflicts, and assure that extra copies of data in caches are tracked in a coherent fashion. Furthermore, each processor puts additional demands on the other components of the system such as storage, I/O, memory, and particularly, the communications buses that connect various components. As more processors are introduced, there is greater likelihood that processors will spend significant time waiting for some resource being used by another processor.

All of these issues and more are known by system designers, and have been addressed in one form or another. While perfect solutions are not available, improvements in this field continue to be made.

Of particular interest herein is the design of communications buses. In simple computer systems, all major components such as processor, memory, storage controllers, and I/O are connected on a single multi-drop communications bus. Physically, such a multidrop bus is a common set of parallel conductors, and each component is connected to the these conductors through logic drivers or gates. The architecture of such a bus permits any arbitrary component connected to the bus to send data to any other arbitrary component connected to the bus, although it is not necessarily the case that all possible combinations are actually used. Since only one component may send data at any time, the component sending data must first obtain control of the bus, a process known as arbitration. The bus typically has an address portion for specifying the receiving device(s), and a data portion for specifying the data being transferred. It may also have various control lines.

The clock speed at which a multi-drop bus operates is limited by the number of attached devices, their physical configuration with respect to one another, the speed at which individual devices operate, and other factors. For this reason, many computer systems have multiple buses. In particular, processors and memory may be coupled to a relatively high-speed bus, while storage and I/O devices may be coupled to a slower bus. Since processors and memory typically require a higher speed, and are physically close enough to support higher speed bus operation, isolation of processors and memory from the lower speed devices such as storage and I/O by using a special processor-memory bus supports bus operation at higher speed and improves system performance.

However, the demand for increased system throughput continues. It is desirable to increase the number of processors in a computer system to increase system throughput. However, the high-speed multi-drop processor-memory bus was intended for a relatively small number of attached components. As the number of processors attached to such a bus increases, it becomes difficult or impossible to operate the bus at the higher clock speeds necessary to support communication among the various components. Moreover, the simple creation of wider buses or of additional (parallel) buses is not always a practical solution. Wider or additional buses means that each processor must have additional I/O pins, where the number of I/O pins is already extremely constrained.

Some designers have attempted to address this problem using hierarchical buses, in which each processor is assigned to a node, all processors within a node being on the same local bus coupled to a node controller, wherein the node controller handles communications with devices in other nodes through a separate remote bus. However, these designs require a great deal of complexity on the part of the node controller, with attendant cost and collateral issues.

There is a need for an alternative high-speed communication path architecture in a computer system for supporting communication among larger numbers of processors and memory.

SUMMARY OF THE INVENTION

It is, therefore, an object of the present invention to provide an enhanced multi-processor computer system.

Another object of this invention is provide an enhanced processor-to-memory communication path for a multiprocessor computer system Another object of this invention is to increase the throughput of a processor-to-memory communication path in a multiprocessor system.

Another object of this invention is to support an increased number of processors in a multiprocessor computer system.

An internal communication network for supporting data communication among multiple processors and memory within a computer system comprises a command portion for transmitting addresses and commands, having a series of links connected by at least one repeater unit, in which a command is transmitted by the initiating device on one link to a repeater, and repeated by the repeater on another link, all at pre-defined bus cycles.

In the preferred embodiment, links are hierarchical and unidirectional, running between processors and local address repeater units (ARPs), and between the ARPs and a global repeater, called an address switch unit (ASW). A data transfer command propagates from a requesting device to its local ARP, and is repeated to the ASW. From the ASW, the command is broadcast to all component devices on the network by transmitting to all ARPs or directly attached memory, and the ARPs then transmit to all attached processors or other units.

In the preferred embodiment, the ASW globally arbitrates the command portion of the network. A request by a processor to transmit an address to the ARP must be granted first by the ASW. Once granted, the command will propagate in a pre-defined number of clock cycles to the ASW through the ARP, and thus addresses are not buffered in the ARP (although they are held in a register for a small number of cycles during re-propagation). Thus the network acts like a pipeline, in which a new command may be broadcast every bus cycle, but multiple bus cycles of latency are required from the time a command is initially transmitted by the originator until all devices have received it.

Preferably, each device on the network independently signals its status and whether the command is intended for it via a separate response link running directly to a global collector. The collector collects responses from all devices and broadcasts a single system wide response back to the devices.

In the preferred embodiment, addresses/commands and data are transmitted on essentially separate paths having different topologies, and at different times, and are arbitrated separately. The data portion of the network comprises a set of bi-directional links from the processors to a local data switch unit (DSW). The local DSW is further linked directly to memory via bi-directional links. In fact, the data portion of the network contains multiple independent data paths supporting multiple simultaneous data transfers, all of which are supported by a single logical hierarchical address bus portion. No address is transmitted with the data; rather, a tag is transmitted which identifies the command with which the data is associated.

Consistent with commonly understood terminology, the network is herein referred to collectively as a "bus" or "memory bus" (the latter to distinguish it from I/O buses). The portion of the network which transmits addresses and commands is sometimes referred to as the "address bus", while the data portion is referred to as the "data bus", and other portions of the network are similarly designated. It will be understood that the communications network described herein is not physically the same as a classical multi-drop bus, although it performs the analogous function.

The bus described herein acts has characteristics of a pipeline, wherein high clock speed (and high throughput) is achieved by staging bus operations over a number of cycles. The use of multiple hierarchical links enables the entire memory bus to operate at high clock speed. Furthermore, because the repeaters and ASW do not buffer data or determine destination through complex directories, the design is greatly simplified vis-a-vis typical prior art hierarchical designs. All of these considerations make it possible to support a relatively large number of processors at a high throughput.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
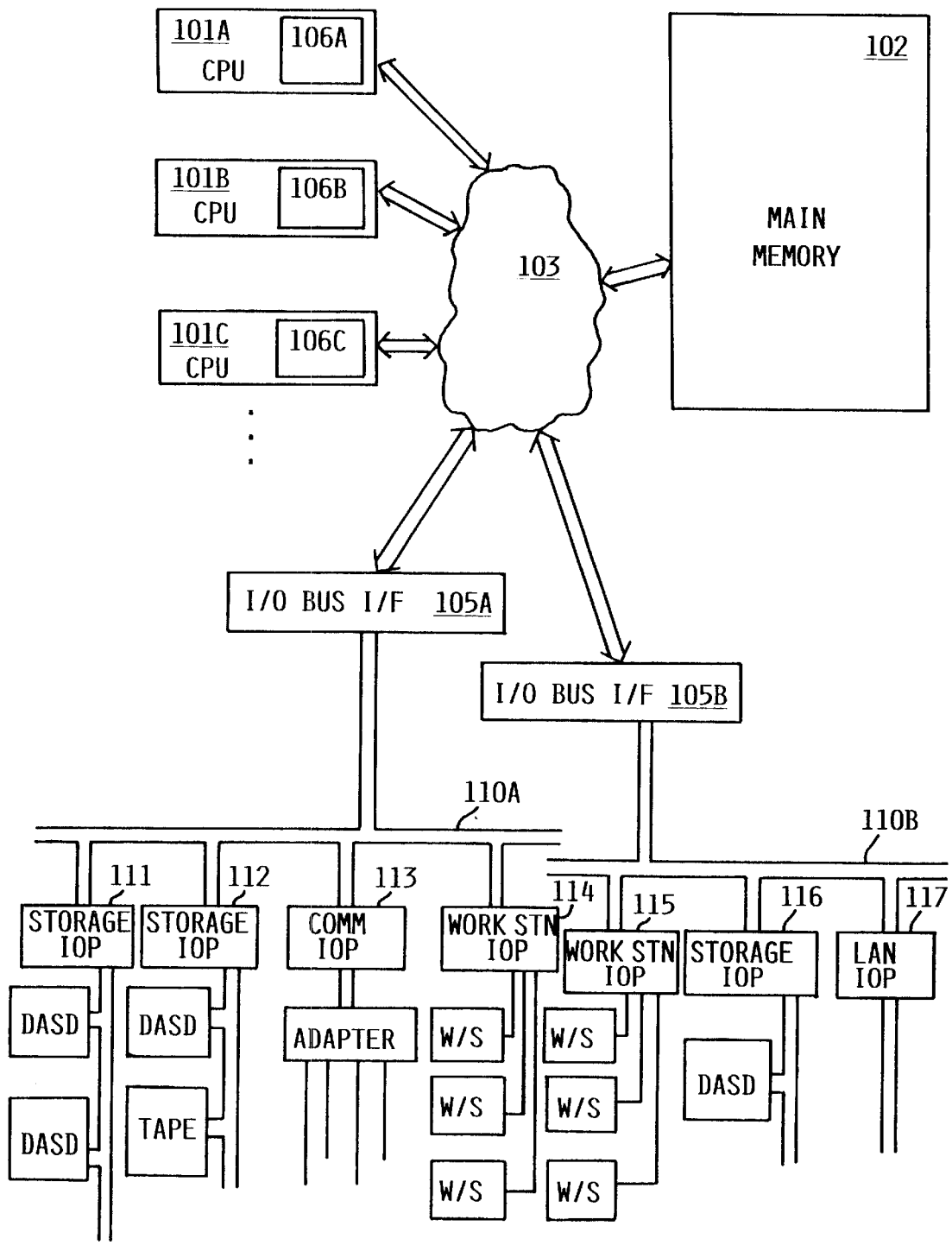
FIG. 1 shows the major hardware components of a multiprocessor computer system for utilizing the high speed memory bus architecture according to the preferred embodiment of the present invention.

The major hardware components of a multiprocessor computer system 100 for utilizing the high speed memory bus architecture according to the preferred embodiment of the present invention are shown in FIG. 1. Multiple central processing units (CPUs) 101A, 101B and 101C perform basic machine processing function on instructions and data from main memory 102. Each processor contains or controls a respective cache. In the preferred embodiment, each processor has a separate on-chip L1 instruction cache, an on-chip L1 data cache, and an on-chip L2 cache directory/controller, the L2 cache itself being in a separate chip. However, these cache structures are shown conceptually in FIG. 1 as a single block 106A, 106B and 106C for each respective processor. For purposes of this invention, the precise implementation details of caching in each processor are not significant, and the caches could be implemented differently.

I/O bus interface units 105A, 105B communicate with multiple I/O processing units (IOPs) 111–117 through respective system I/O buses 10A, 110B. In the preferred embodiment, each system I/O bus is an industry standard PCI bus. The 10Ps support communication with a variety of storage and I/O devices, such as direct access storage devices (DASD), tape drives, workstations, printers, and remote communications lines for communication with remote devices or other computer systems. While three CPUs, two I/O bus interface units and I/O buses, and various numbers of IOPs and other devices are shown in FIG. 1, it should be understood that FIG. 1 is intended only as an illustration of the possible types of devices that may be supported, and the actual number and configuration of CPUs, buses, and various other units may vary. For simplicity, CPUs, bus interface units, and system I/O buses are herein designated generically by reference numbers 101, 105 and 110, respectively.

In FIG. 1, feature 103 conceptually represents a memory bus for communicating among the various processors 101, memory 102 and I/0 interface units 105. Clearly, some form of communication path is required for multi-processor computer system 100 to function. This function could theoretically be performed (although not necessarily at acceptable performance levels) using a single multi-drop bus connected to all the processors, memory, and I/O interface units. The present invention is directed toward providing essentially this function at improved performance.

In the preferred embodiment, computer system 100 is an IBM AS/400 multiprocessor computer system, it being understood that the present invention could be implemented on other multiprocessor computer systems.

Figure 2A:
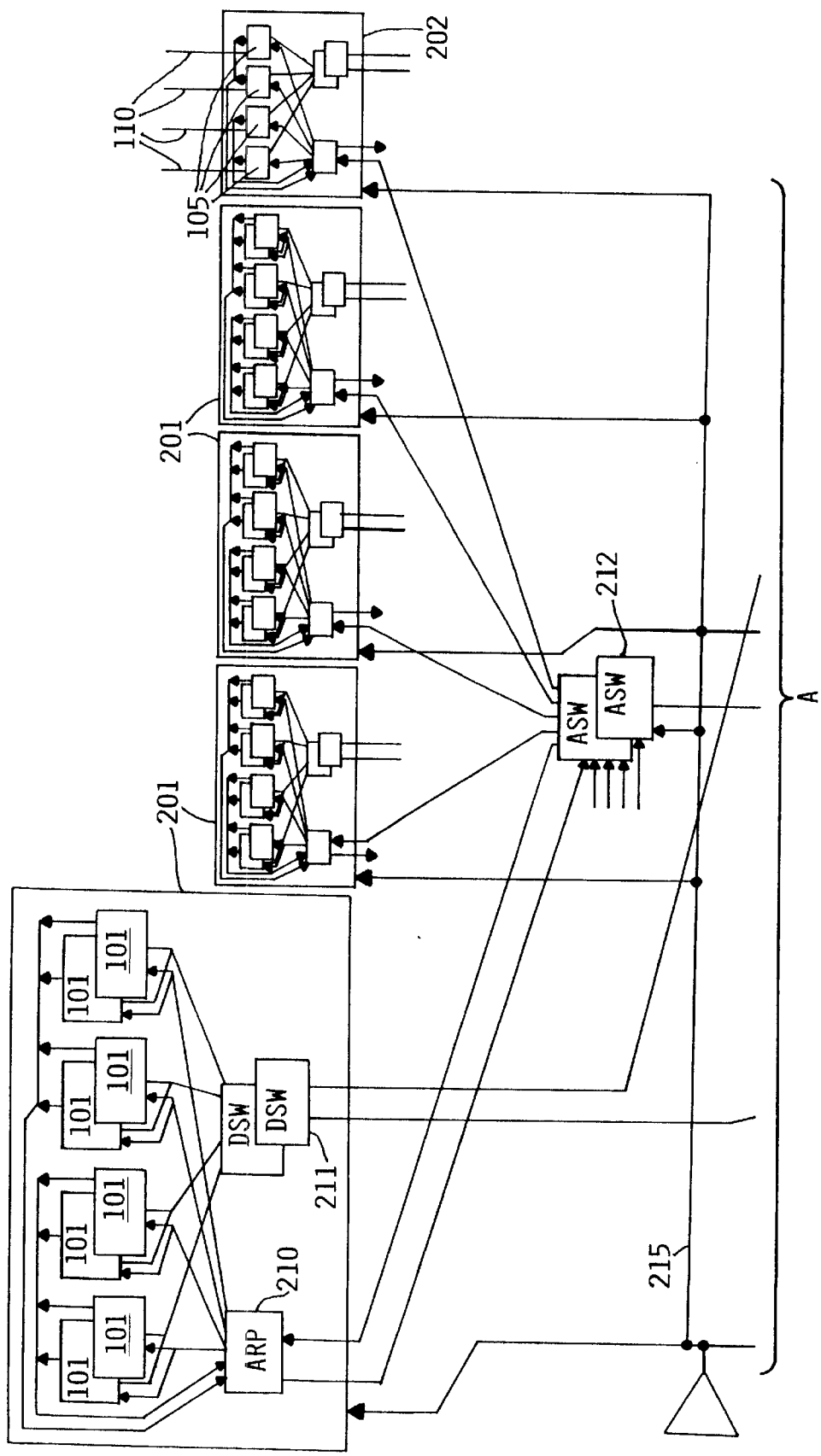
FIG. 2 shows in greater detail the overall topology of the memory bus, according to the preferred embodiment.
Figure 2B:
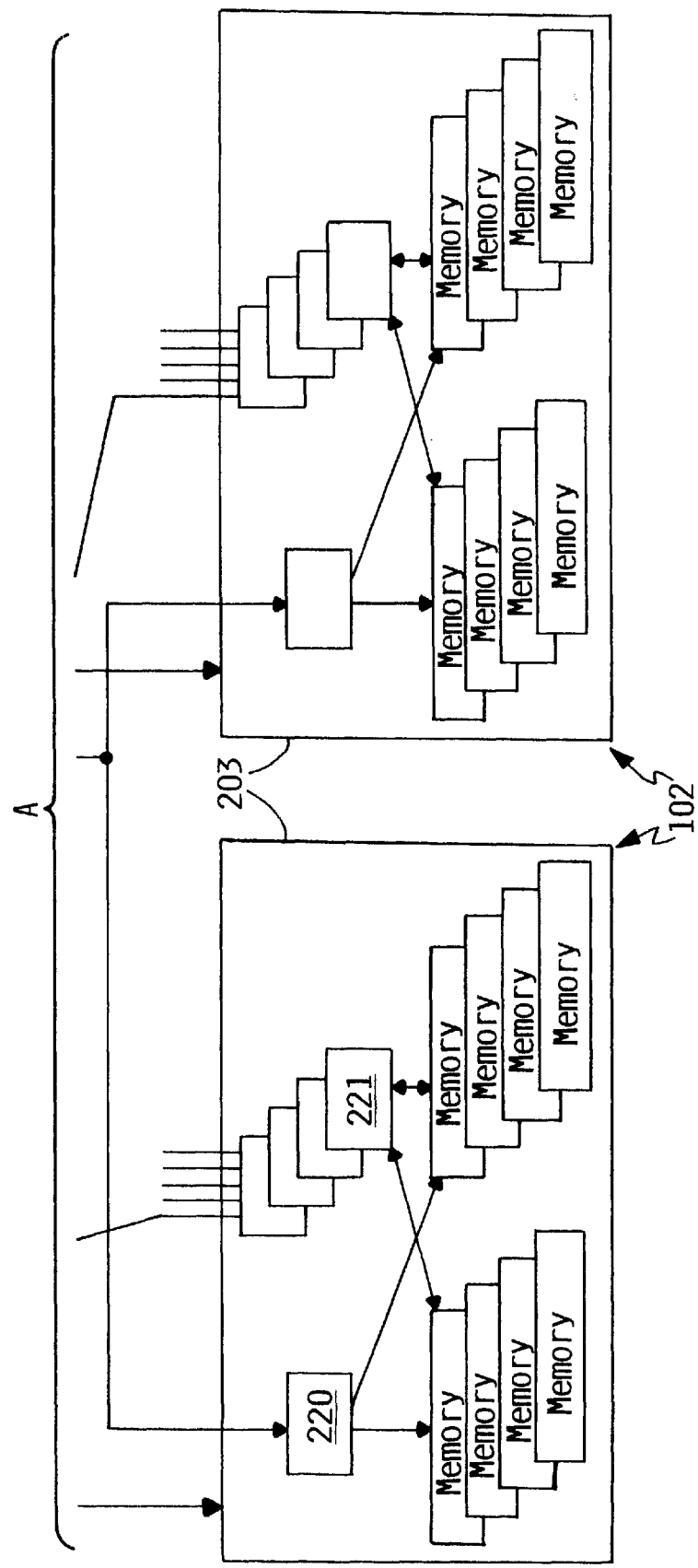

FIG. 2 shows in greater detail the overall topology of memory bus 103. Processors 101 are mounted on electronic circuit cards 201, each card defining a separate local node. Each card 201 can hold up to eight processors 101, although cards will not necessarily always have the architectural maximum number of processors. Each card 201 also contains an address repeater unit (ARP) 210 and a data switch unit (DSW) 211. In the preferred embodiment, data switch unit 211 is implemented on two chips (hence the depiction in FIG. 2), but it acts as a single functional unit, as described herein. Local address bus links (i.e., contained entirely within card 201) connect each processor 101 with the ARP unit 210 in its card, while local data bus links connect each processor 101 with the DSW unit 211 in its card. These are described more filly below.

In addition to one or more processor cards 201, each containing multiple processors, the system will typically contain one or more I/O cards 202. Each I/O card is also a separate local node in the memory bus network, and contains up to four I/O bus interface units 105, each unit communicating (through adapter hardware, not shown) with a respective PCI bus 110. As in the case of processor cards, each I/O card 202 will not necessarily contain the architected maximum number of interface units 105. Each I/O card 202 similarly contains an ARP unit 210 and a DSW unit 211, the I/O bus interface units 105 being coupled to ARP 210 by local address bus links, and being coupled to DSW 211 by local data bus links, as described more fully herein.

Main memory 102 is contained in one or two memory subsystems 203, each subsystem having separate physical packaging (i.e., each subsystem may be on one or more separate cards or assemblies of cards. Each subsystem is also another local node from the perspective of the memory bus, although the memory subsystem nodes function somewhat differently from processor and I/O interface nodes. The memory controller card contains a memory address interface (MAI) unit 220 and a memory data interface (MDI) unit 221 (the latter being implemented in the preferred embodiment and depicted in FIG. 2 as four chips, but functionally a single unit). The memory address interface unit 220 receives addresses on the memory bus and routes address signals to physical memory. Data interface unit 221 handles communication of data between the memory bus and physical memory devices. The two memory subsystems are configured so that the identity of the memory subsystem storing a particular data address is derivable from the address itself, e.g., by taking a single bit of the address. This assists data routing for various bus operations.

All ARP units 210 and memory address interface units 220 are coupled via remote links to a single central address repeater unit (also referred to as the address switch, or ASW) 212 (depicted in FIG. 2 as two chips, but functionally a single unit). These links are "remote" in the sense that they are go from card to card (intercard links). ASW 212 propagates addresses among local nodes and handles global memory bus arbitration.

A global clock signal 215 is distributed to all nodes and to ASW 212. All memory bus activity is synchronized to this global signal.

Figure 3:
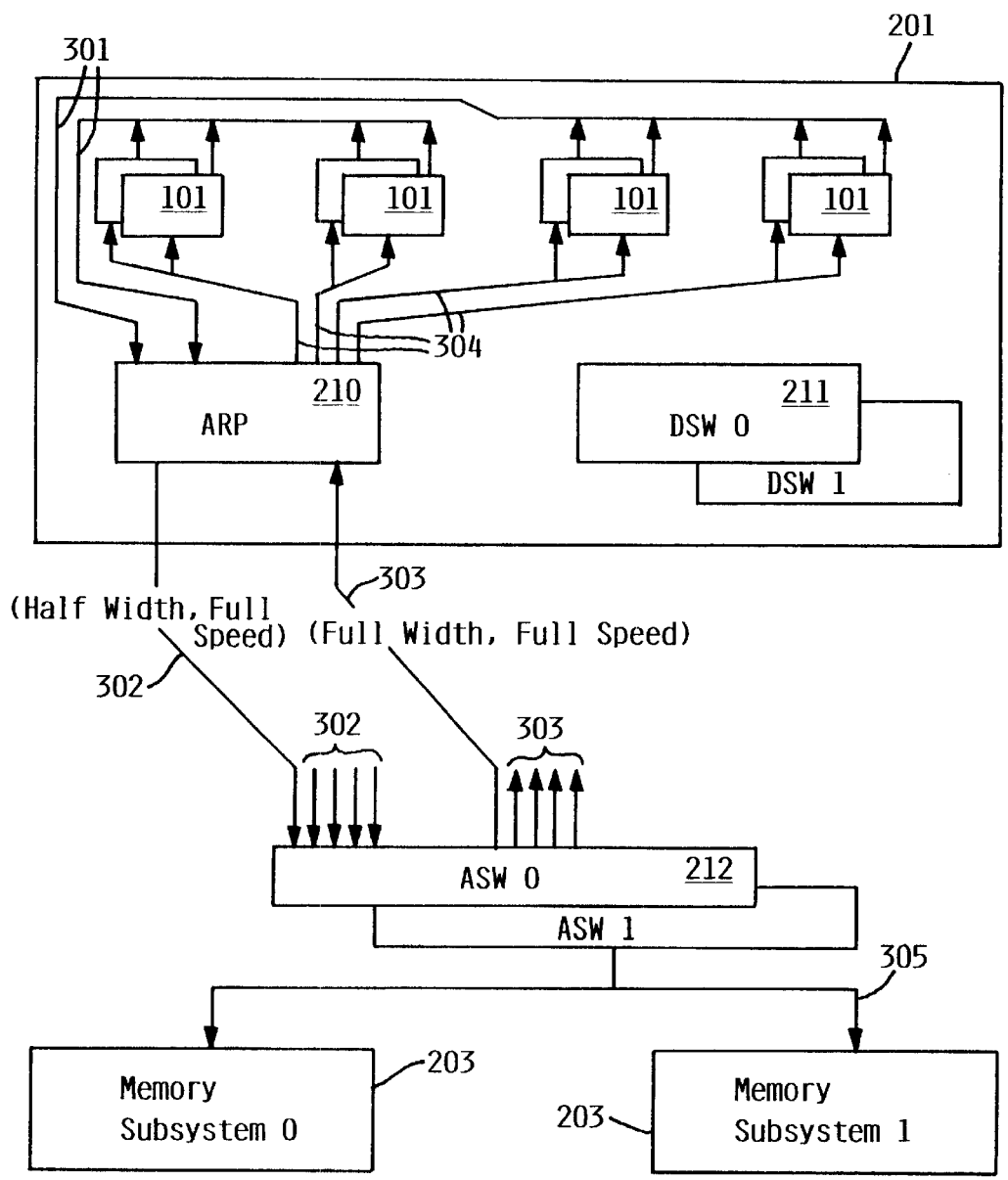
FIG. 3 shows in greater detail the components of the address bus portion of the memory bus, according to the preferred embodiment.

FIG. 3 shows in greater detail the components of the address bus portion of memory bus 103. The address bus portion transmits a destination address, a command code, a tag, and some miscellaneous bits, and although it contains information other than the address, it is designated simply the "address bus" for convenience. Each processor card 201 contains two unidirectional local address request buses 301 running from processors 101 to ARP 210, each local address request bus 301 supporting up to four processors. Each local address bus 301 is physically a shared set of parallel lines, the number of lines being one-half that required to transmit a complete address along with associated command, tag, parity and other control information. I.e., unidirectional local address request buses 301 are half-width, two bus cycles being required to transfer a complete address and associated information. Since the bus is shared, only one processor can transmit in any given cycle. The I/O card 202 is similar, but each local address bus 301 supports two I/O interface units 105.

A single unidirectional remote address request bus 302 runs from ARP 210 to ASW 212. There is a separate bus 302 from each ARP 210 to ASW 212 (including ARP 210 in I/O node card 202), requiring a separate port (separate set of input pins) for each bus 302. Like bus 301, each bus 302 is half-width, and requires two bus cycles to transmit a full address along with associated control information.

ARP 210 has no buffering capability. The addresses received on buses 301 are held in repeater registers for two cycles, but APR 210 can not otherwise hold address information received on bus 301. Therefore, only one of buses 301 within a card 201 can transmit to the ARP 210 at any one time. ASW 212 grants the right to transmit to a processor 101 (or I/O interface unit 105), and ARP 210 simply gates the appropriate one of buses 301 into its repeater registers for transmission to ASW 212 on remote address request bus 302.

A single respective unidirectional remote address broadcast bus 303 runs from ASW 212 to each ARP 210. This bus is used to transmit all addresses received by ASW 212 to the various local nodes, i.e., address requests received by ASW 212 are broadcast to all the local nodes. Unlike request bus 302, broadcast bus 303 is full width, capable of transmitting the entire address and associated control information in a single bus cycle.

A set of four unidirectional local address broadcast buses 304 runs from ARP 210 to the processors 101 (or, in the case of an I/O card 202, to I/O bus interface units 105, not shown). These buses are used to broadcast addresses received by ARP 210 from ASW 212 on bus 303. ARP 210 makes no decisions as to which processor(s) or bus interface unit(s) will receive the addresses; it simply broadcasts any address coming in on bus 303 to all devices in its local node (card). Since remote broadcast bus is 303 is full width, it follows that local broadcast buses 304 must also be full width. While connections to only one node 201 are shown in FIG. 3, it will be understood that these connections are repeated for each node, the additional connections being omitted from the figure for clarity of illustration.

A single unidirectional memory address broadcast bus 305 runs directly from ASW 212 to memory address interface units 220 in each of the memory subsystems 203. Bus 305 acts like bus 303, broadcasting addresses and associated control information to the memory subsystems. Memory address interface units 220 further propagate this information within the memory subsystems 203, but for purposes of understanding memory bus 103, it is not necessary to describe the memory subsystem architecture in detail here. Bus 305 is also a full width bus, carrying all the address and associated information in a single bus cycle.

It will be observed that ASW 212 contains five ports receiving up to five separate half-width remote address request buses 302 from up to five separate nodes 201. ASW 212 can receive addresses from more than one node simultaneously. In fact, it is intended that it do so. Addresses received on buses 302 are half-width, being received in two separate clock cycles, while addresses transmitted out on buses 303 and 305 are full width, being transmitted in a single cycle. In order to utilize buses 303 and 305 to full capacity, addresses from separate nodes are received in overlapping concurrent fashion by ASW 212 on the half-width buses 302.

The use of half-width buses 301, 302 rather than full width saves precious I/O pins on the processor, ARP and ASW chips. In theory, if one assumes that all nodes make an equal number of requests, the address request buses can be 1/N the width of the broadcast bus 303, where N is the number of nodes which can request use of the memory bus. In the present architecture, a half-width (N=2) is chosen, because the number of nodes will vary depending on customer configuration, and it is difficult to guarantee that nodes will submit an equal number of requests. However, the bus width can vary, and in particular, if the present architectural concepts are applied to a system having a larger number of nodes and processors, request buses of ⅓ width, ¼ width, or smaller may be appropriate.

Figure 4:
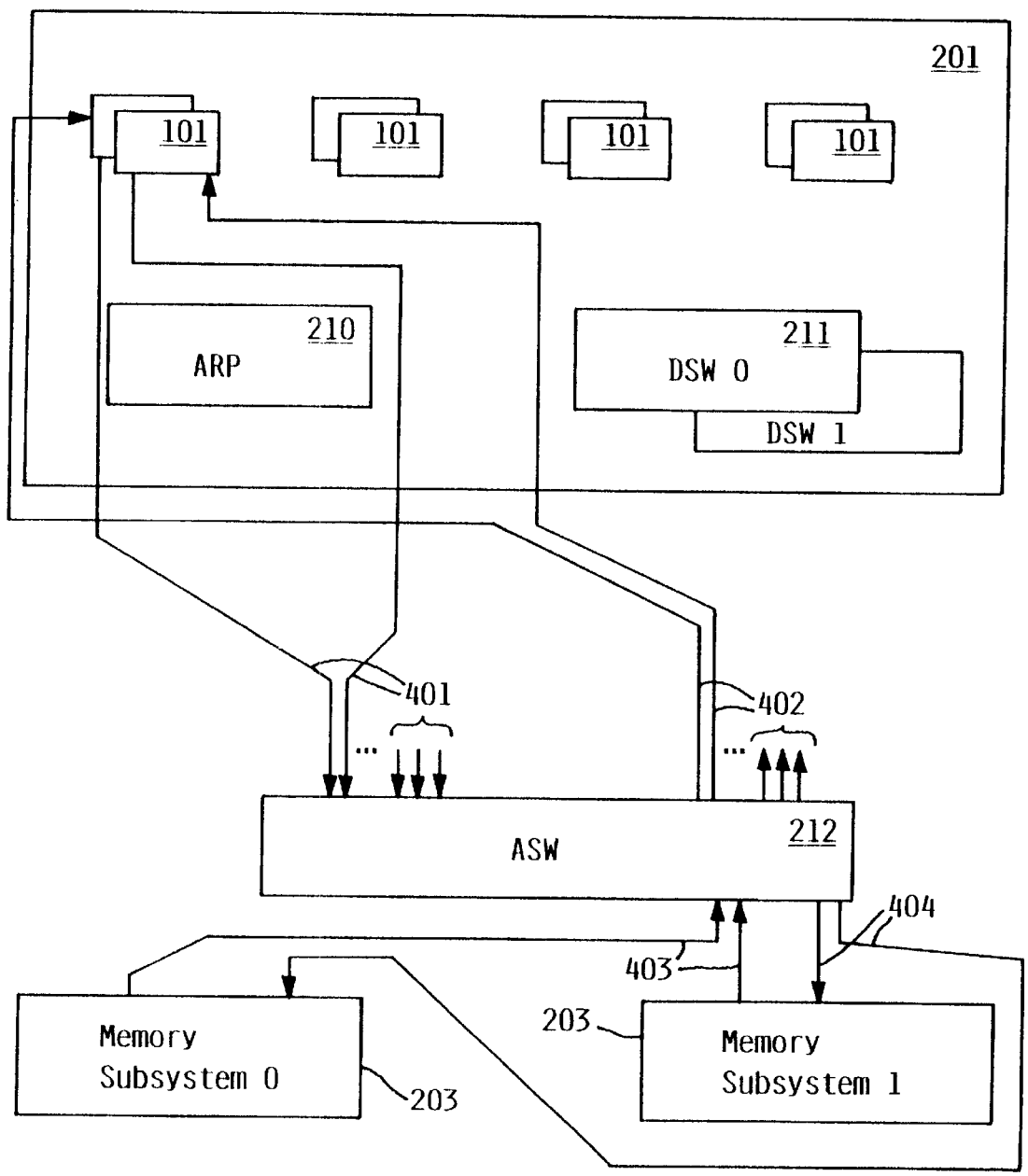
FIG. 4 shows in greater detail the components of the status bus portion of the memory bus, according to the preferred embodiment.

FIG. 4 shows in greater detail the components of the status bus portion of memory bus 103. The status bus comprises multiple unidirectional point-to-point links running directly between processors 101 or I/O bus interfaces units 105 and ASW 212. I.e., these links by-pass ARP 210. Particularly, a separate unidirectional send status link 401 runs from each processor 101 (or I/O bus interface unit 105, not shown) to a respective input port on ASW 212. A separate unidirectional receive status link 402 runs from a respective output port on ASW 212 to each respective processor 101 (or I/O bus interface unit 105, not shown). Each unidirectional point-to-point link 401 or 402 is physically two parallel line (not including a parity line, which is a combined parity line for the status and response buses). While connections to only two processors are shown in FIG. 4, it will be understood that these connections are repeated, the multiple connections being omitted from the figure for clarity of illustration.

Additionally, a separate point-to-point send status link 403 runs from each memory subsystem 203 to a respective port on ASW 212. A separate point-to-point link 404 runs from a respective port on ASW 212 to each memory subsystem 203, links 403 and 404 containing the same two parallel lines as links 401 and 402.

The two lines of the status bus are sufficient to specify one of four possible status states, each having an associated priority, from Table 1 below:

TABLE 1

| Priority | Status |
| --- | --- |
| 1 | Address Parity Error |
| 2 | Retry |
| 3 | Address Acknowledge |
| 4 | Null (not decoded, no parity error, no retry) |

The lower number indicates a higher priority. The ASW collects status received from all devices, and broadcasts the highest priority status received. Thus, an address parity error, indicating a severe hardware fault, has the highest priority and will automatically be broadcast in preference to any other response. This will usually abort processing and trigger some machine check condition. A retry indicates that a device has not had time to determine whether the command is intended for it, e.g., a processor has not had time to look in its cache to determine whether it has a copy of the data. Because the bus architecture operates on a pipeline paradigm, all devices must respond on a pre-defined bus cycle, whether they have had time to determine the correct response or not. Understandably, in some cases a processor may be so busy with other high priority tasks that it can not make the required determination, but the need to respond dictates that it request a retry of the command. An address acknowledge is the response when a device determines that the command is applicable to it, e.g., it has a copy of the requested data, although not necessarily the only copy. A device responds with null if the command is not applicable to the responding device.

Figure 5:
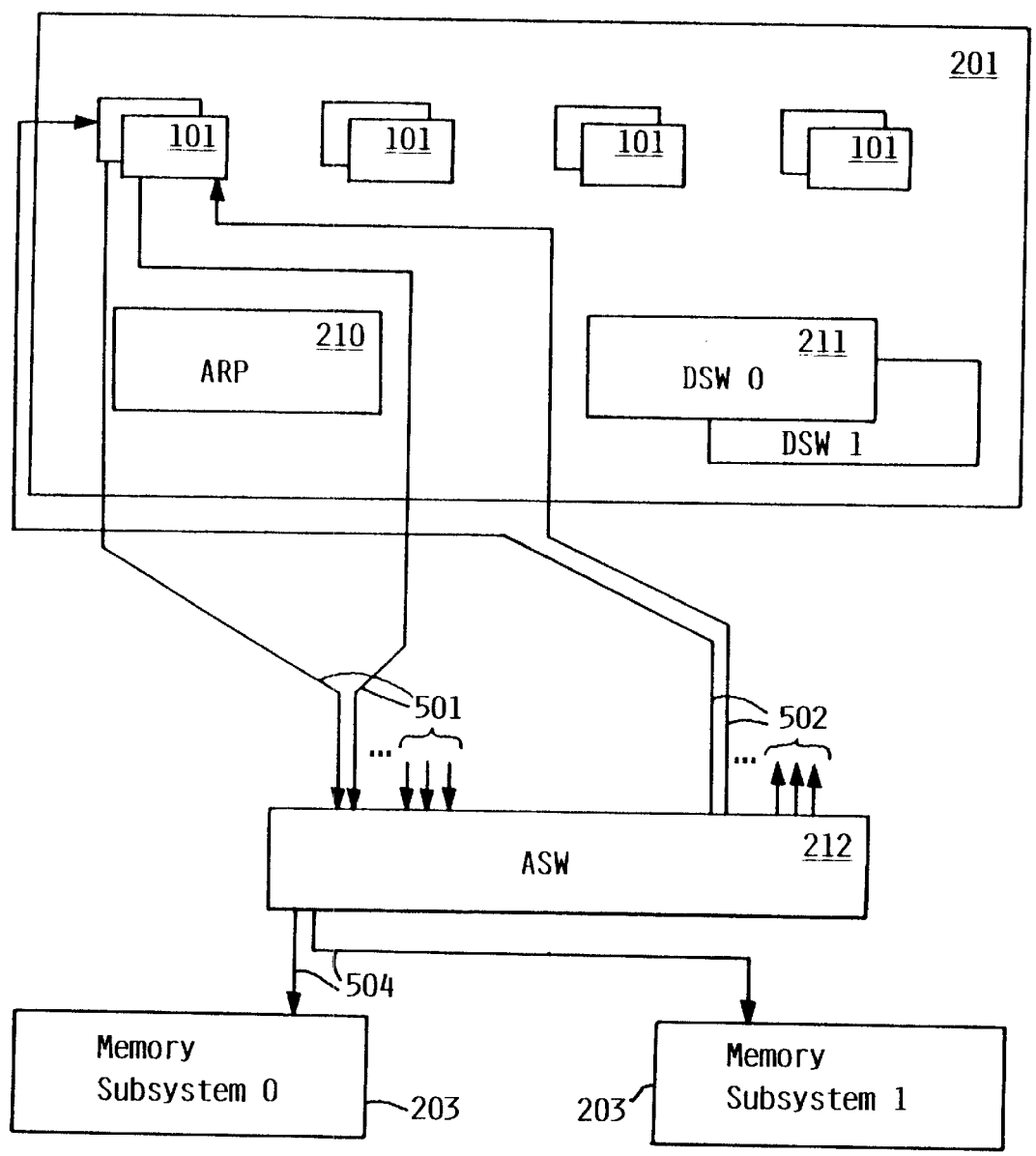
FIG. 5 shows in greater detail the components of the response bus portion of the memory bus, according to the preferred embodiment.

FIG. 5 shows in greater detail the components of the response bus portion of memory bus 103. The response bus is similar to the status bus, and comprises multiple unidirectional point-to-point links running directly between processors 101 or I/O bus interfaces units 105 and ASW 212, by-passing ARP 210. A separate unidirectional send response link 501 runs from each processor 101 (or I/O bus interface unit 105, not shown) to a respective input port on ASW 212. A separate unidirectional receive response link 502 runs from a respective output port on ASW 212 to each respective processor 101 (or I/O bus interface unit 105, not shown). Each unidirectional point-to-point link 501 or 502 is physically three parallel lines (not including parity). While connections to only two processors are shown in FIG. 5, it will be understood that these connections are repeated, the multiple connections being omitted from the figure for clarity of illustration. Additionally, a separate point-to-point receive response link 504 runs from the ASW to each memory subsystem 203, also containing three lines. There is no send response link running from the memory subsystems to the ASW, since the memory subsystems generate only status, not responses.

The three lines of the response bus are sufficient to specify one of up to eight responses, each having an associated priority (lower number being highest). However, not all eight possibilities are used. The responses used in the preferred embodiment are listed in Table 2 below:

TABLE 2

| Priority | Response |
| --- | --- |
| 1 | Retry |
| 2 | Modified - Intervention |
| 3 | Shared - Intervention |
| 4 | Rerun |
| 5 | Shared |
| 6 | Null or Clean (Not Modified or Shared) |

The ASW collects responses received from all devices, and broadcasts the highest priority response received. A retry indicates that the device may have modified data, but has not had time to determine this. Modified-intervention means that the responding device has modified data in its cache; this has a relatively high priority, because only the modified data should be used. Shared-intervention means that the responding device has a shared but unmodified copy of data in its cache, which should be used instead of the copy from memory. The shared-intervention response is optionally enabled, depending upon system configuration, and location of the responding device relative to the bus master. The rerun response is similar to retry, but has a lower priority. The shared response indicates that the responding device has a shared (unmodified) copy of the data, but it will not intervene and send a copy to the bus master. Null indicates that the responding device does not have a copy of the data.

Figure 6:
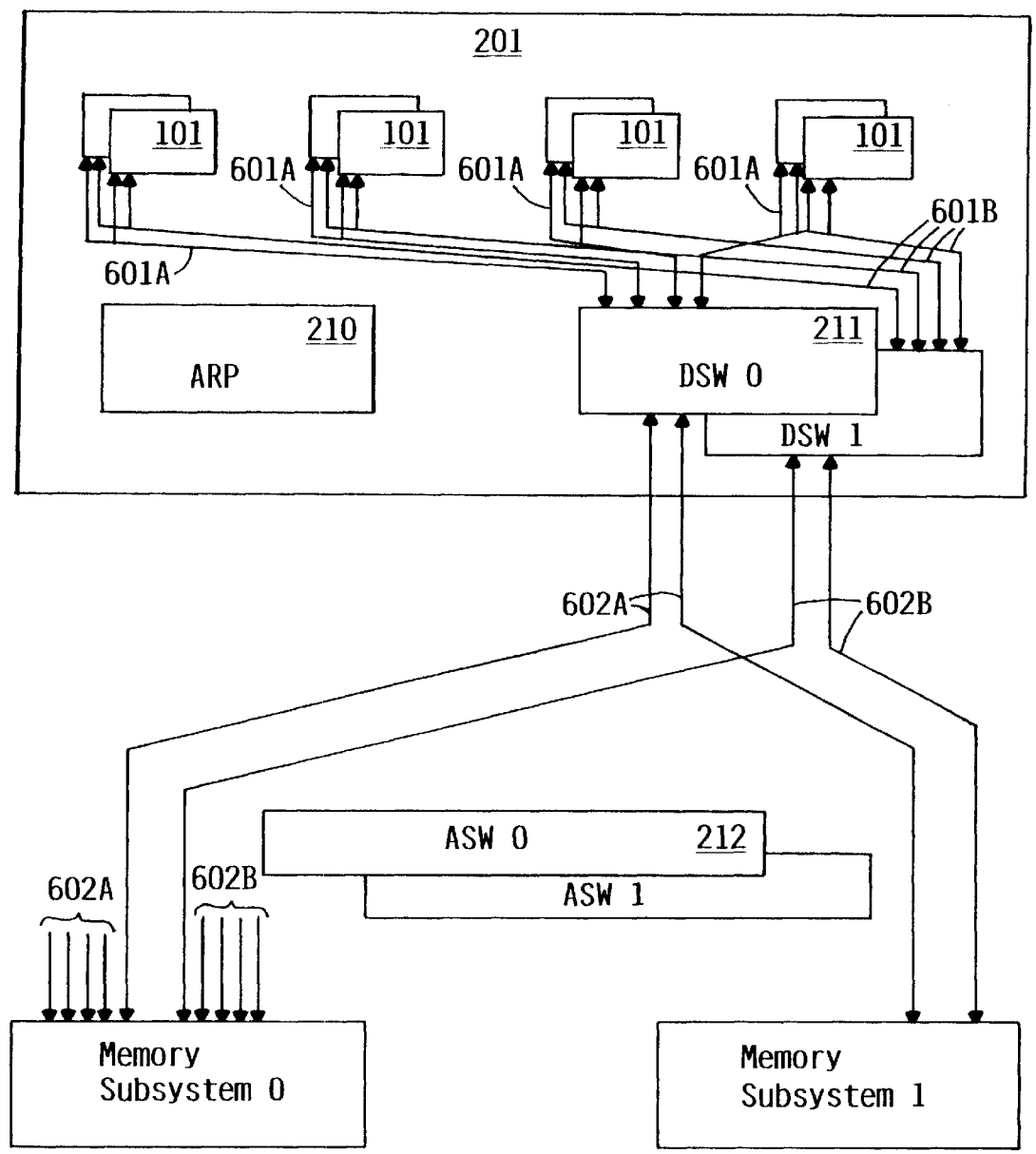
FIG. 6 shows in greater detail the data bus portion of the memory bus, in accordance with the preferred embodiment.

FIG. 6 shows in greater detail the data bus portion of memory bus 103. The data portion contains a set of bidirectional parallel local data buses 601A, 601B, running between processors 101 (or I/O interface units 105, not shown) and DSW 211. Because DSW is physically contained on two chips, the high order bits of each bus 601A are coupled to one of the DSW chips, while the low order bits of each bus 601B are coupled to the other. FIG. 6 illustrates the local data buses as two separate buses designated 601A and 601B, but they are logically a single wide parallel bus, sometimes hereinafter referred to as local data bus 601. Each local data bus 601 connects a pair of processors 101 (or a single I/O bus interface unit 105) with a respective port on DSW 211. DSW 211 contains four bus ports, supporting eight processors 101 (or four I/O bus interface units 105).

The data bus portion further contains a set of bidirectional point-to-point remote data buses 602A, 602B running between DSW 211 and the memory subsystems 203. As in the case of the local data buses, the high order bits 602A are coupled to one of the DSW chips, while the low order bits 602B are coupled to the other. Because each remote data bus running between a memory subsystem and DSW is logically a single wide parallel bus, the pair 602A and 602B are sometimes herein referred to as remote data bus 602.

There is no buffering of data in DSW 212. As in the case of the ARP 210, DSW 212 acts as a repeater unit, holding data in registers for two clock cycles when transmitting between a local data bus and a remote data bus.

A separate remote data bus 602 runs from each DSW 211 to each memory subsystem 203. These buses can-carry data independently on the same bus cycle. DSW 212 can direct from any arbitrary local bus to remote bus or vice-versa, provided the buses are free. Thus it is possible for one of the processors in a given node to be transmitting data to (or receiving data from) memory subsystem 0 at the same time that another processor in the same node transmits data to (or receives data from) memory subsystem 1, provided, however, that these two processors are on different local data buses 601. This parallelism can be repeated for each node. Since the system supports up to five nodes, it is possible for ten data transfers to be occurring simultaneously.

Figure 7:
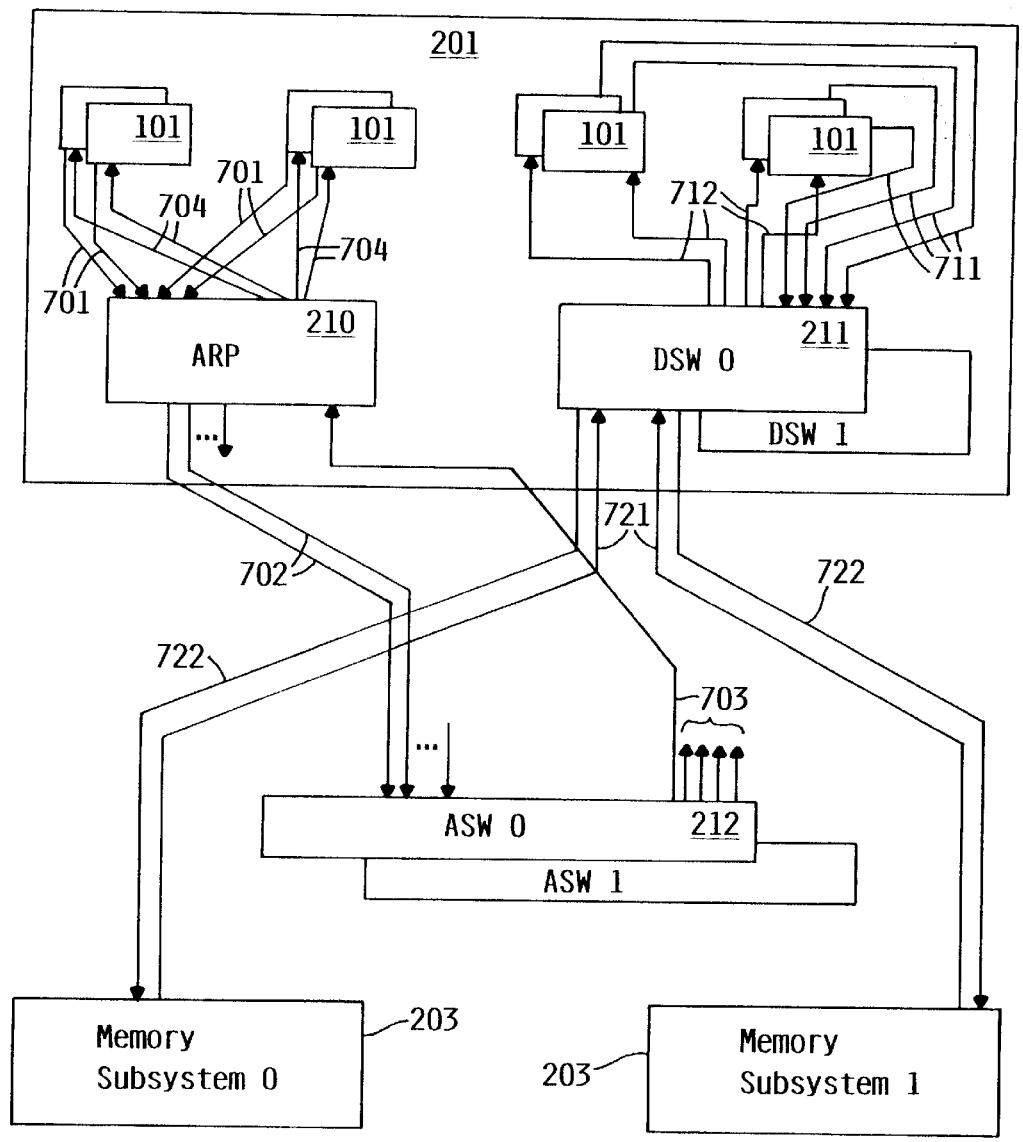
FIG. 7 shows in greater detail the components which support arbitration of the memory bus, according to the preferred embodiment.

FIG. 7 shows in greater detail the arbitration lines for supporting arbitration in memory bus 103. A set of unidirectional local address bus request (ABR) lines 701 runs from each processor 101 (or I/O bus interface unit 105) to a respective port the local ARP unit 210. Each is a single line carrying a single electrical signal (bit), used by the processor to request the address bus. A corresponding set of unidirectional remote address bus request lines 702 runs from ARP 210 to ASW 212, i.e., for each line 701, there is one and only one line 702. ARP 210 acts only as a repeater unit for the local bus request lines 701, repeating any signal put on a local bus request line 701 by its processor on the corresponding remote address bus request (RDRV_ABR) line 702. Since there are potentially eight processors in a node, each ARP receives up to eight lines 701, and drives up to eight lines 702. The ASW has forty ports for receiving up to forty (eight lines times five nodes) remote address bus request lines 702.

ASW 212 grants the address bus by signaling on one of the remote address bus grant (RDRV_ABG) links 703. Each link 703 is a unidirectional 4-bit bus running from ASW 212 to the local ARP unit 210. Although multiple address bus requests might come in on the same cycle (requiring a separate request line for each processor), the ASW can only grant the bus to one processor at a time. Therefore, there is no need for forty output ports on the ASW supporting up to forty address bus grant lines 703. A 4-bit bus to each ARP (total of 20 output lines) is sufficient to specify the identifier of a single processor to which the address bus is granted. Four bits are required because there are nine possible outputs: a bus grant to any one of the eight processors, or no bus grant at all.

The ARP decodes the bus grant signal received on remote bus grant link 703. If a bus grant to one of its local processors is specified, ARP signals the corresponding processor on unidirectional local address bus grant line 704. There is a separate local address bus grant line 704 running from the local ARP to each local processor (total of eight lines). Each ARP unit thus has four input pins for receiving its remote grant line 703, and eight output pins for driving local grant lines 704. While FIG. 7 depicts local lines 701 and 704 running to four processors in local node 201, it will be understood that local lines 701 and 704 connect to all processors, and further that additional remote lines 702, 703 connect to all nodes, the additional lines being omitted from the figure for clarity of illustration.

Only processors and I/O bus interface units initiate transfers on the memory bus 103. The memory subsystem itself is merely a passive entity, responding to data transfer requests. Therefore, the memory subsystem does not have any address bus request lines running to ASW 212.

The data bus is arbitrated separately from the address bus (although not entirely independently, since the address bus must be obtained first before any data transfer can take place). Data bus arbitration is handled by the DSWs. Since there are multiple data bus paths from memory to different processors supporting multiple simultaneous data transfer, global data bus arbitration is not necessary. Arbitration can be handled as the local node level. I.e., the DSW determines whether the local data bus 601 and the remote data bus 602 required to support a requested data transfer are available, and if so, grants the data bus request, without regard to data bus activity to and from other nodes.

A separate unidirectional local data bus request (DBR) line 711 runs from each processor 101 (or I/O interface unit 105) to a respective port on the DSW 211 in its local node. This line is used by the processor to request the data bus (after the address bus has been granted, as explained more fully below). The DSW grants a processor's (or I/O interface unit's) request by signaling on a local data bus grant (DBG) line 712, there being a separate unidirectional line 712 for each processor, and a separate port for each such line on DSW 211. While FIG. 7 depicts local lines 711 and 712 running to four processors in local node 201, it will be understood that local lines 711 and 712 connect to all processors, the additional lines being omitted from the figure for clarity of illustration.

A separate unidirectional memory data bus request (DBR) line 721 runs from each memory subsystem 203 to each DSW 211, and a separate unidirectional memory data bus grant (DBG) line 722 runs from each DSW 211 to each memory subsystem. Lines 721 and 722 support data bus grant and request from the memory subsystem. Although the memory subsystem does not initiate any data transfer operations, it will request control of the bus to complete a data transfer requested by another device. E.g., if a processor requests a read of data in memory, the processor initially obtains the address bus to make the request, but the memory subsystem must obtain the data bus to fulfill the request once the data is available for transfer.

Because the address and data buses are arbitrated separately, there must be some mechanism for matching data to requests. This is accomplished by using a tag. The tag accompanies all commands and all data transmissions. The tag contains the.device identifier of the bus master and a sequence number assigned by the bus master. The identifier is not the same as a memory address. Since it only has to identify a unique bus device, a rather small number of bits is required. In the preferred embodiment, six bits uniquely identify a device, three bits identifying the node, two bits identifying the local data bus 601 to which the device is attached, and one bit identifying the device on the local data bus. Thus, the identifier not only uniquely identifies a device, but also identifies its physical location. The sequence number in the preferred embodiment is four bits. The bus master assigns the next available sequence number with each bus transaction it originates. When data is returned to the bus master on a read, the bus master can match it to a request by using the sequence number.

There are additional miscellaneous control lines which are not shown. In particular, there are various steering signal lines for steering data on the data bus. Because the data bus is granted asynchronously from the address bus (as explained in greater detail below), it is necessary to direct the DSW where to route the data. This mechanism is described in greater detail in commonly assigned copending patent application Ser. No. 09/439,586, to H. Lee Blackmon, et al., entitled "Data Routing Using Status-Response Signals", herein incorporated by reference.

The operation of the memory bus will now be described with reference to the above described figures and to FIGS. 8–13, representing timing diagrams of system operation. As shown and described in FIG. 2, a global system clock is distributed to all key components and controls the timing of signals transmitted on the memory bus. A memory bus transfer is initiated by either a processor 101 or an I/O bus interface unit 105. The initiator of a bus transfer is referred to as the bus master. The following is an very crude summary of the steps involved in bus transfer (these steps being more fully described herein), it being understood that some steps may not be performed in all cases, some steps may overlap, and some additional steps may be performed in some cases:

(a) bus master requests and is granted the address bus from the ASW;

(b) bus master transmits address and command information on the address bus, which is broadcast to all devices;

(c) devices respond with status, which is collected in the ASW and broadcast;

(d) devices respond with response, which is collected in the ASW and broadcast;

(d) data sender (which may or may not be bus master) requests and is granted a data bus; and (e) data sender sends data on the data bus.

Figure 8A:
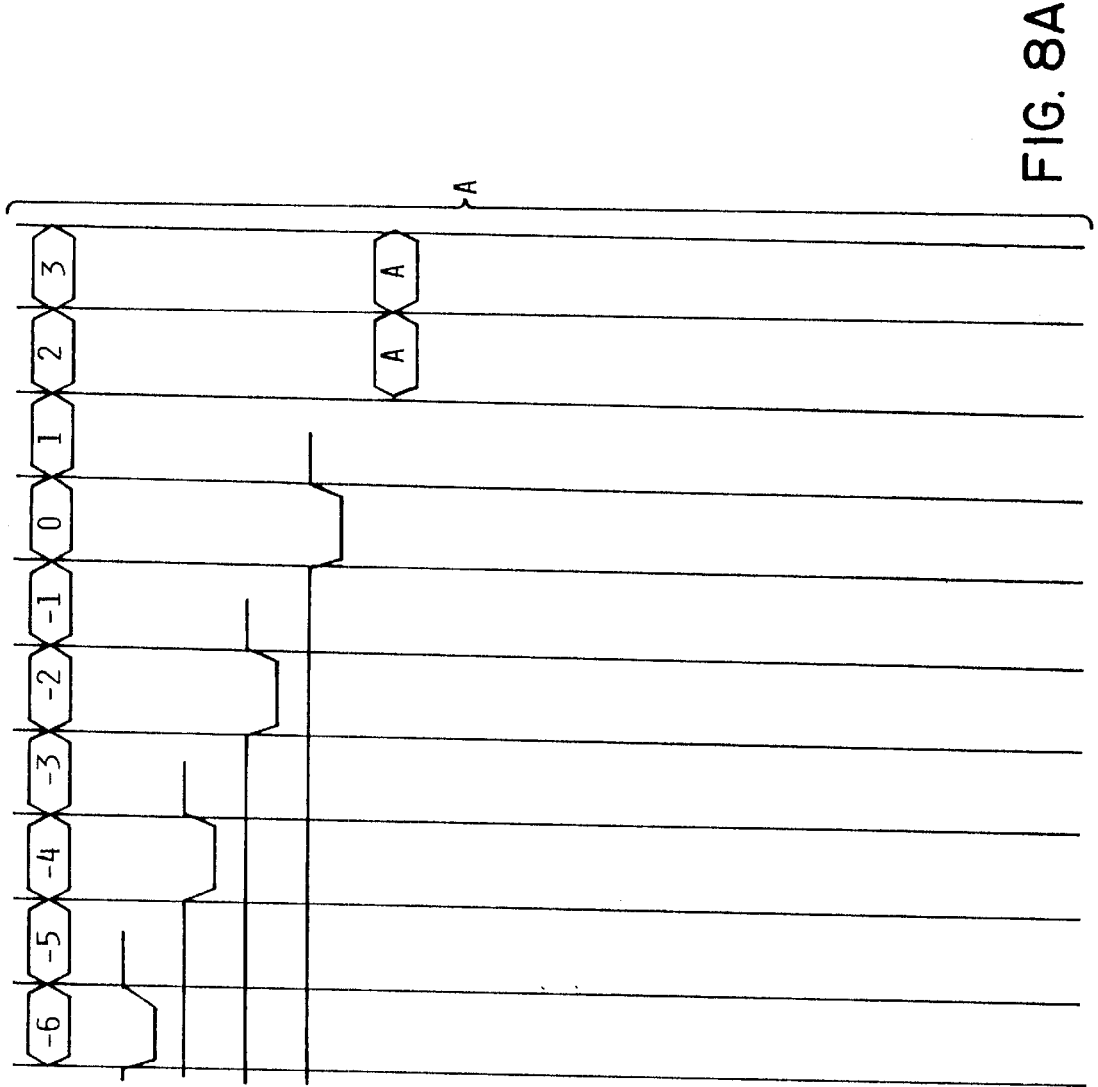
FIG. 8 is a timing diagram of bus activity for a command-only bus transmission, according to the preferred embodiment.
Figure 8B:
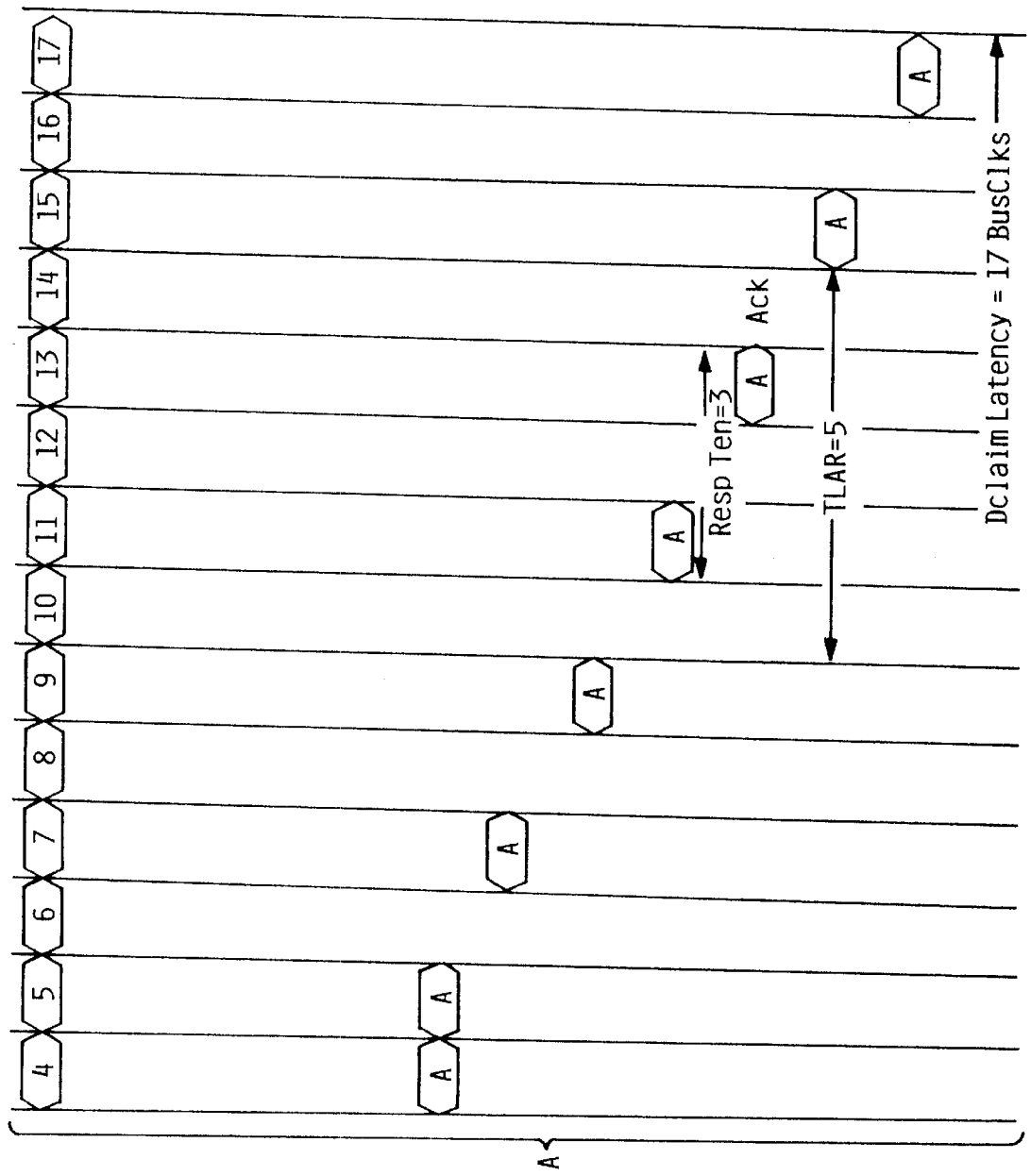
Figure 9A:
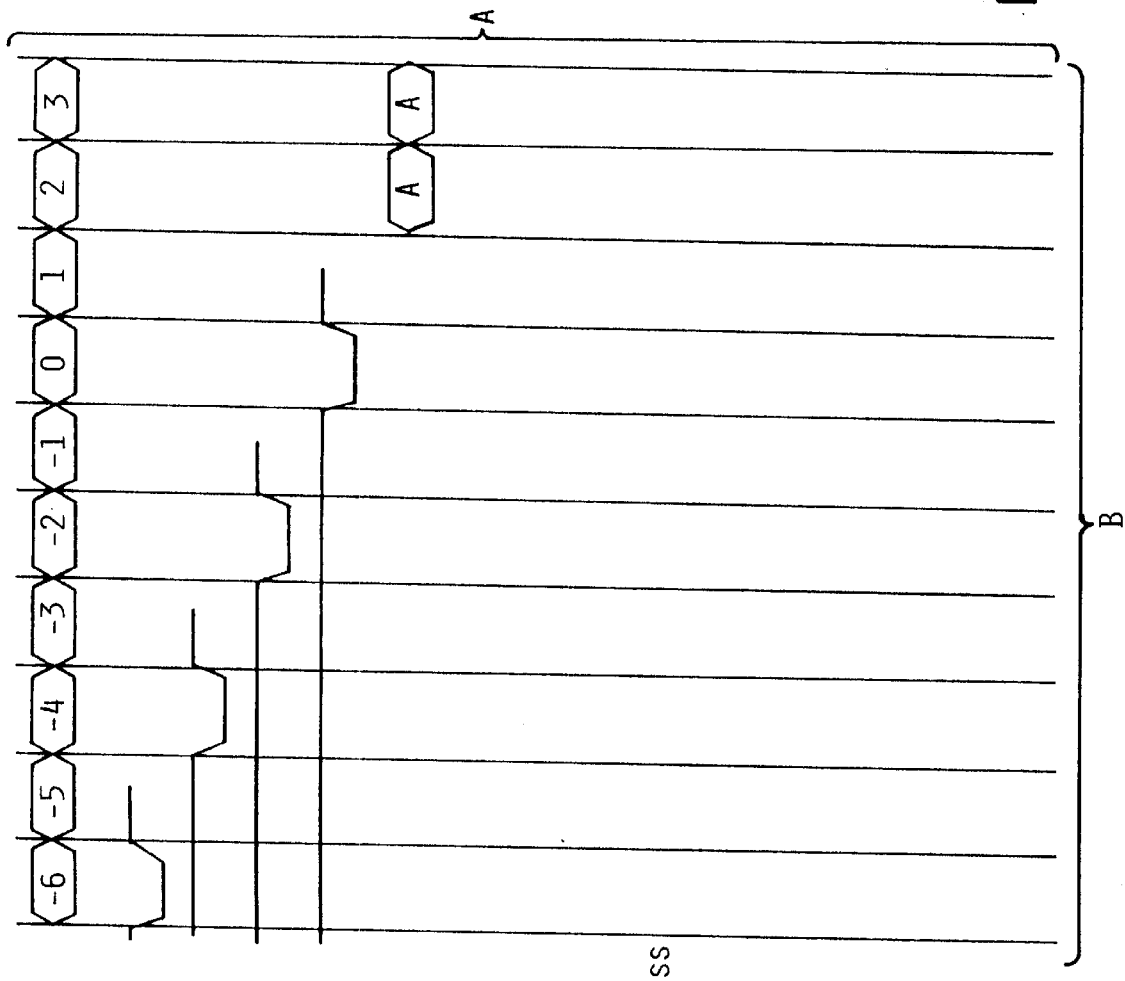
FIG. 9 is a timing diagram of bus activity for a read-from-memory bus transmission, according to the preferred embodiment.
Figure 9B:
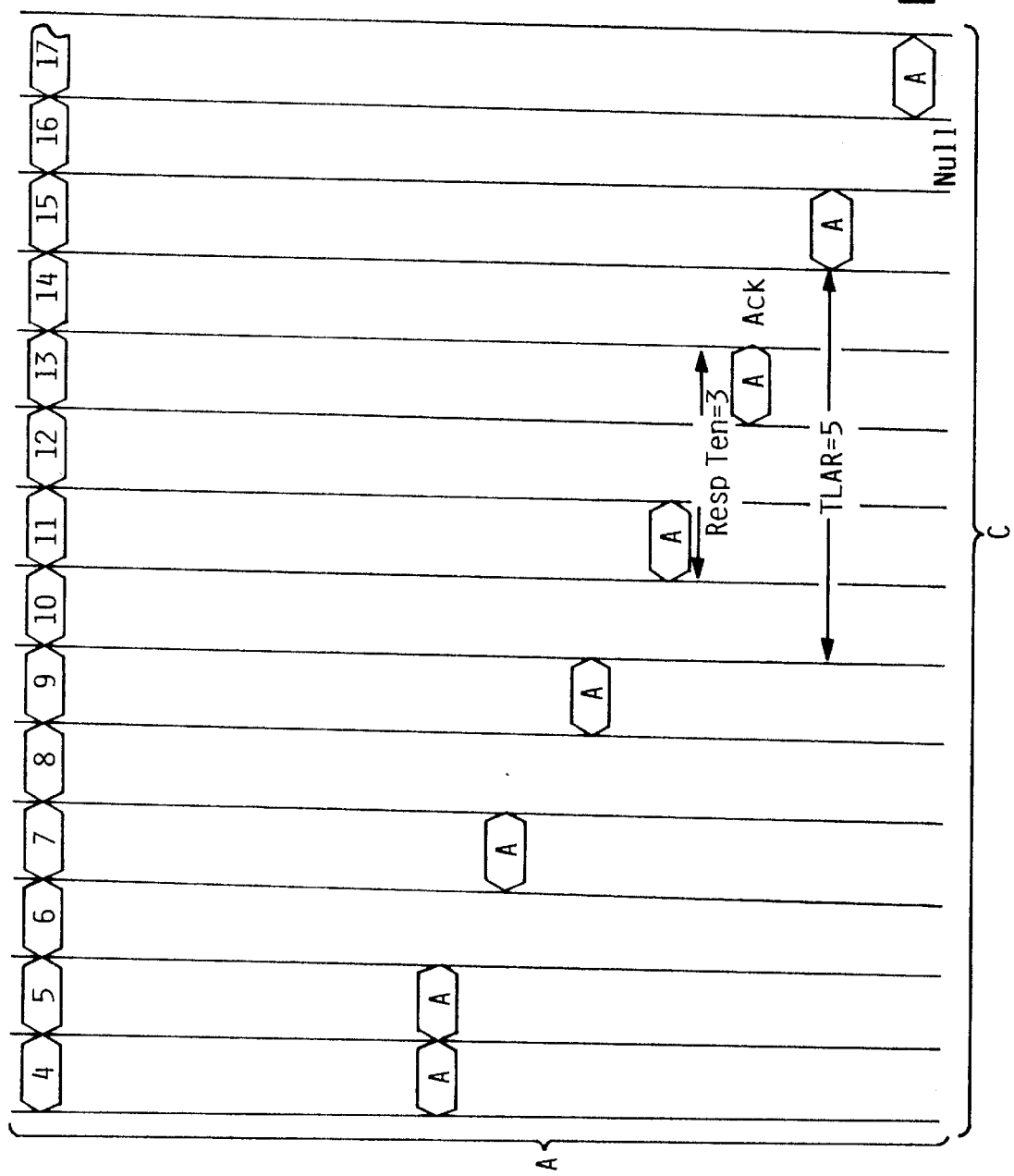
Figure 9C:
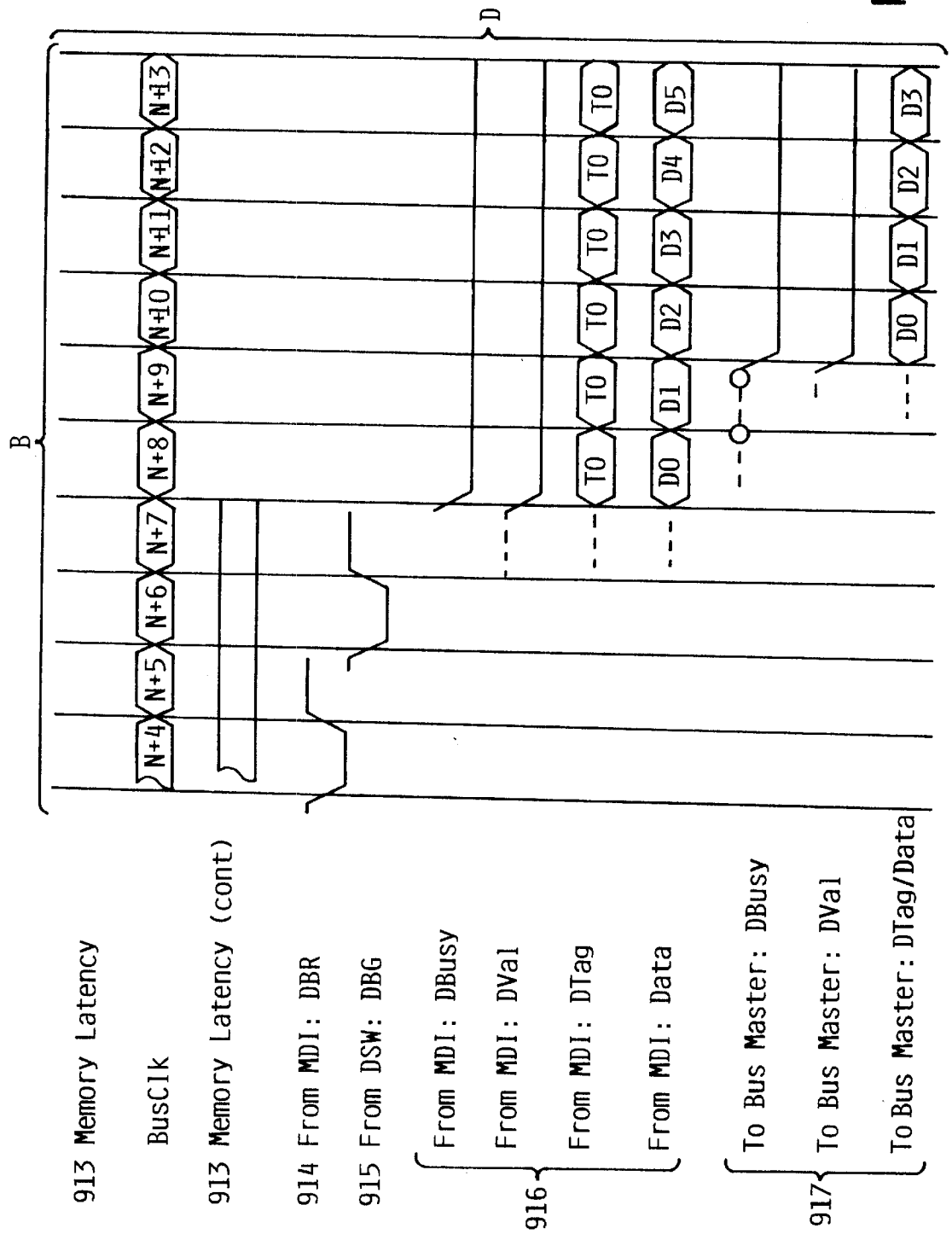
Figure 9D:
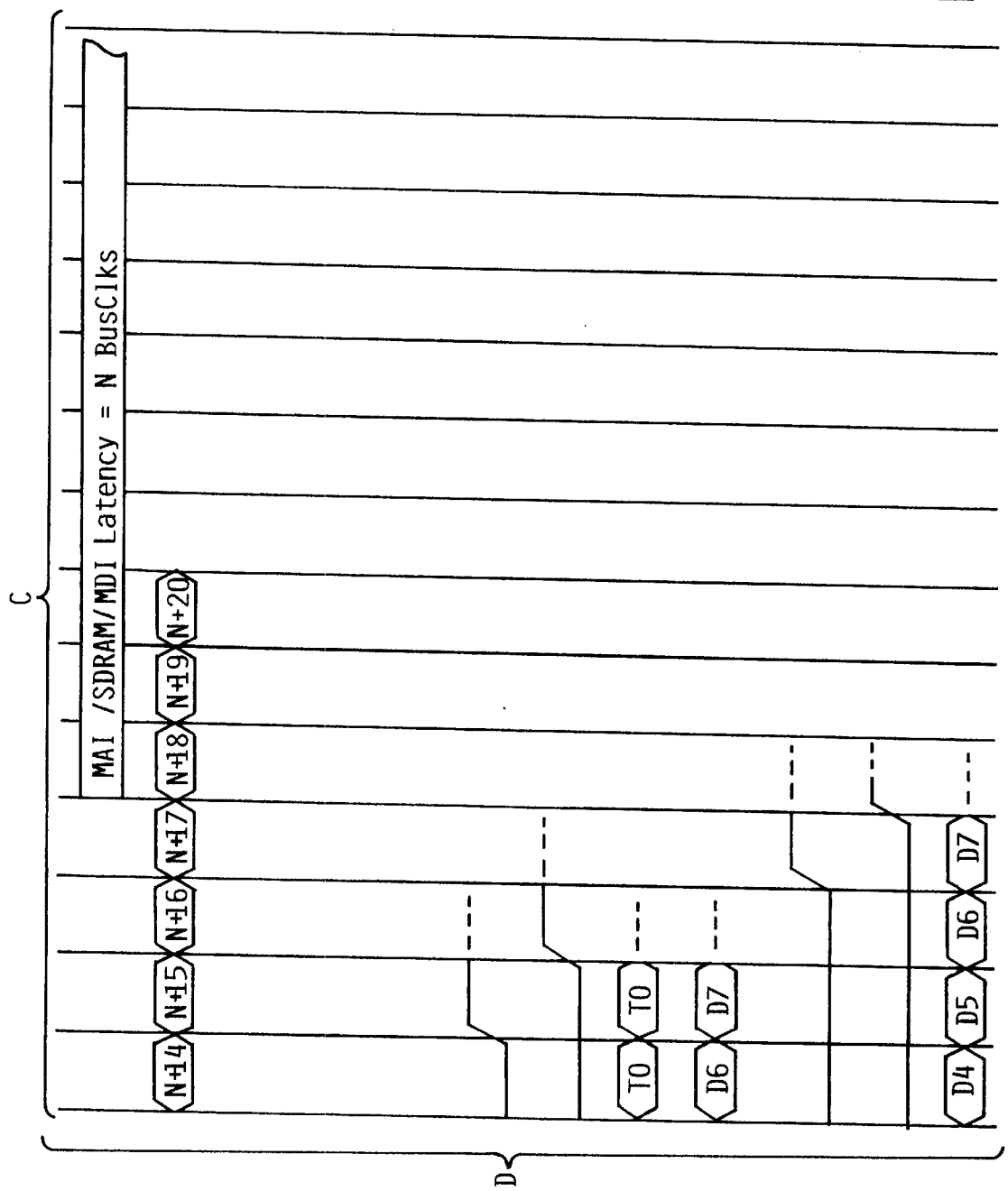
Figure 10A:
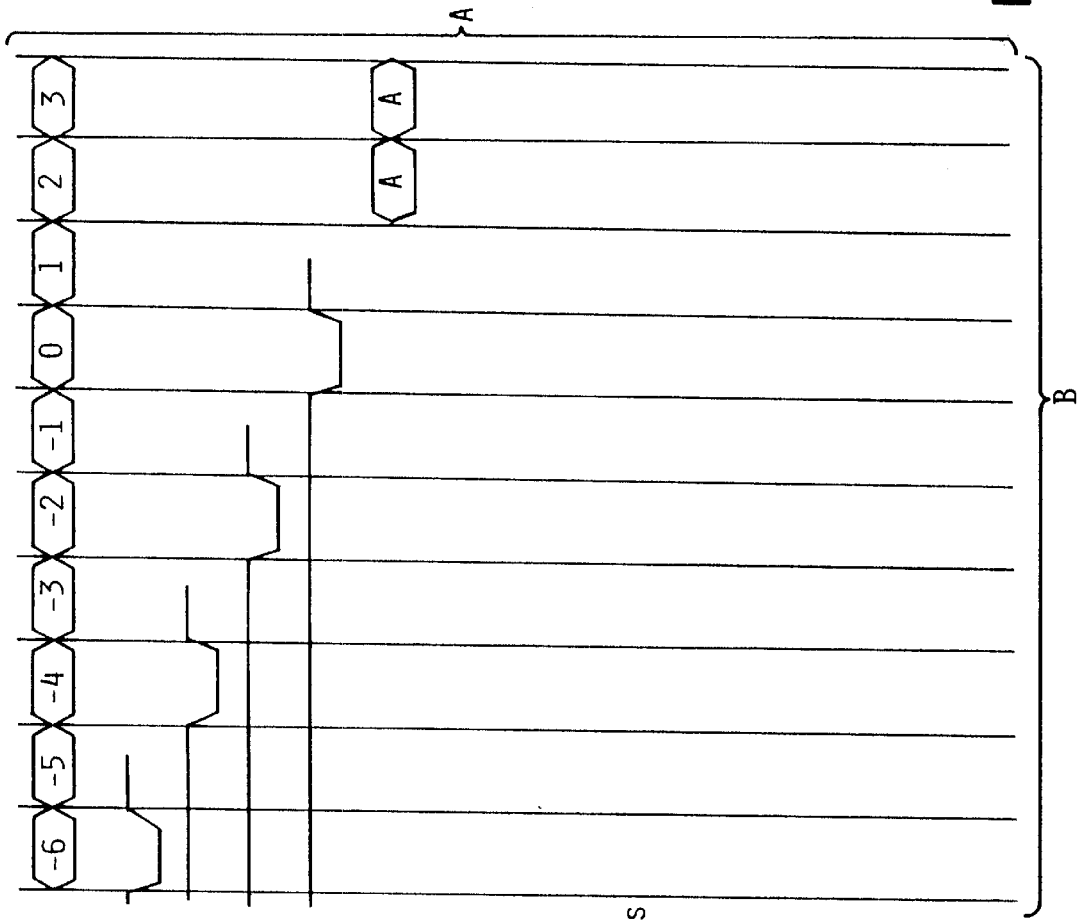
FIG. 10 is a timing diagram of bus activity for a write-to-memory bus transmission, according to the preferred embodiment.
Figure 10B:
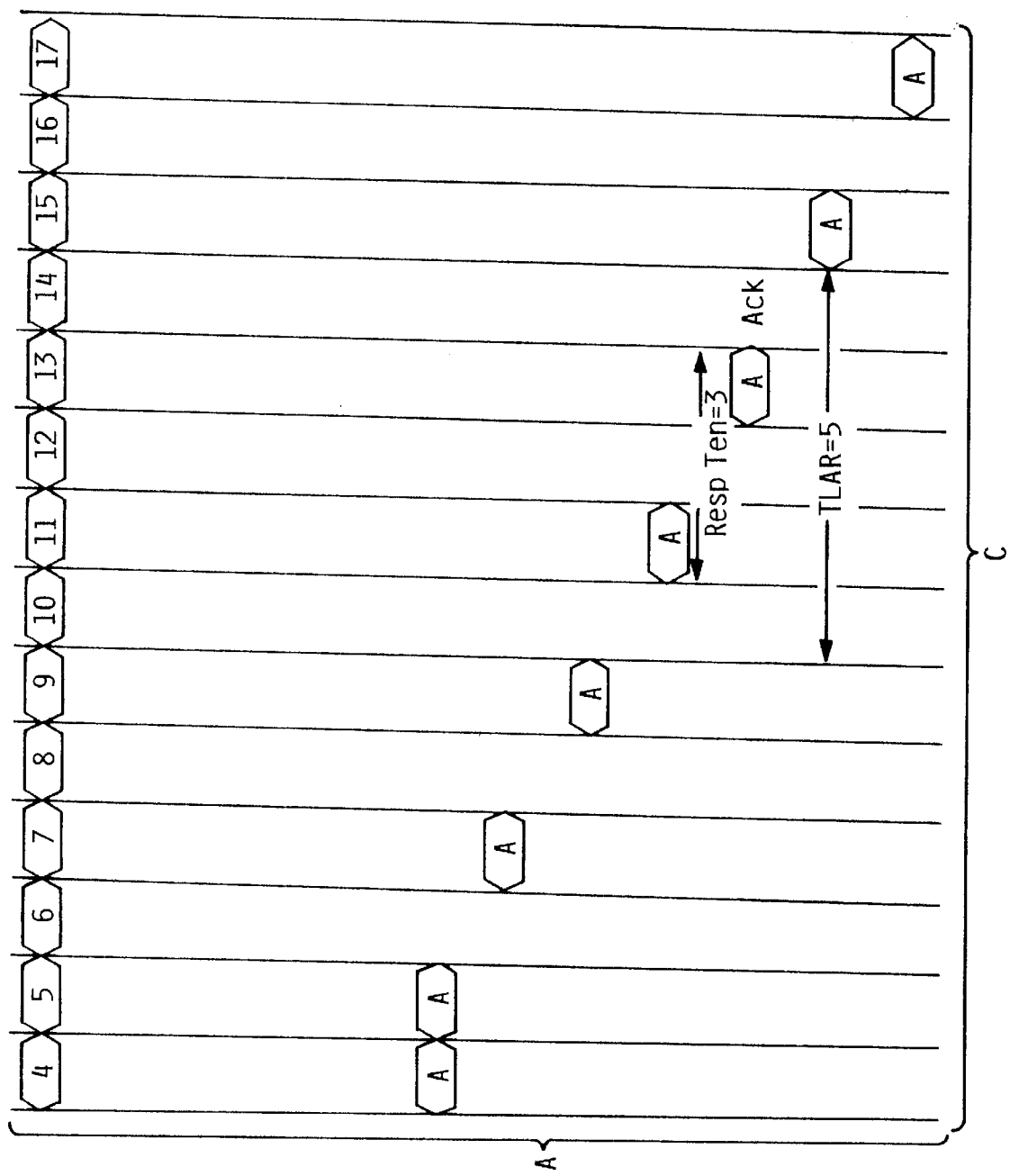
Figure 10C:
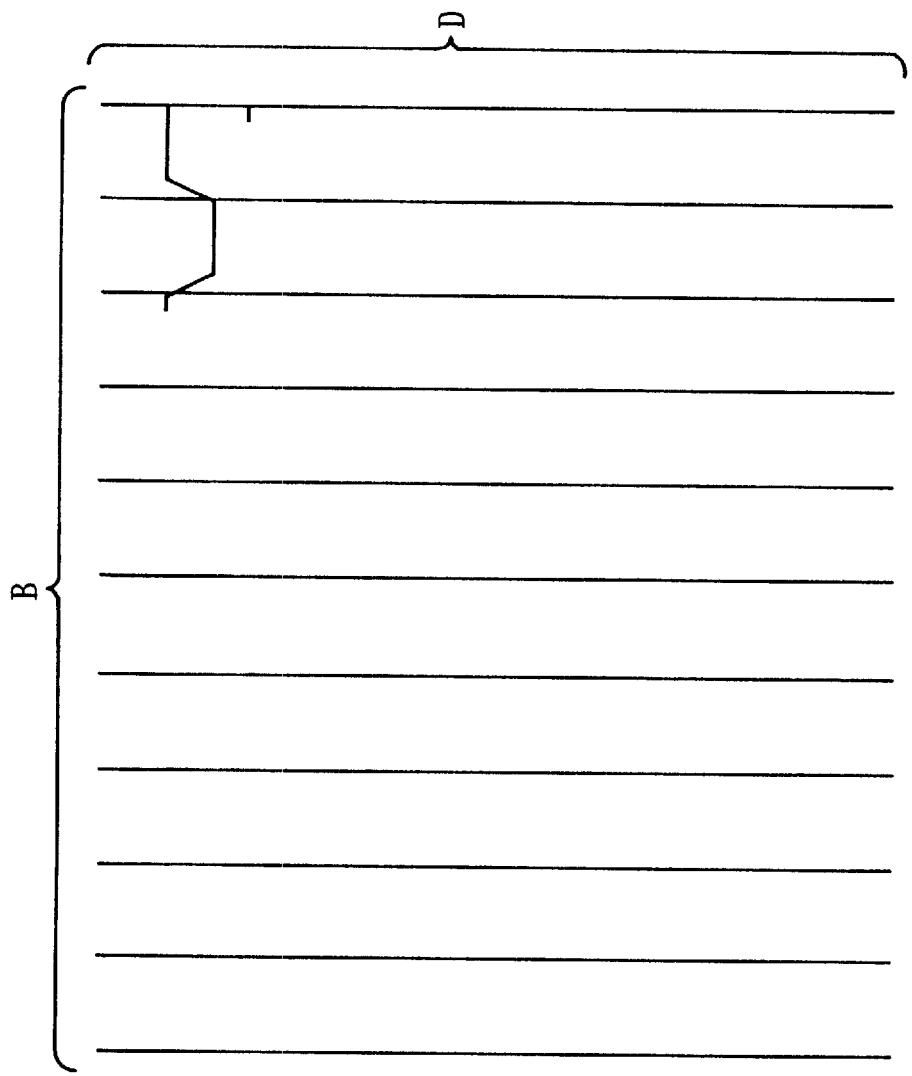
Figure 10D:
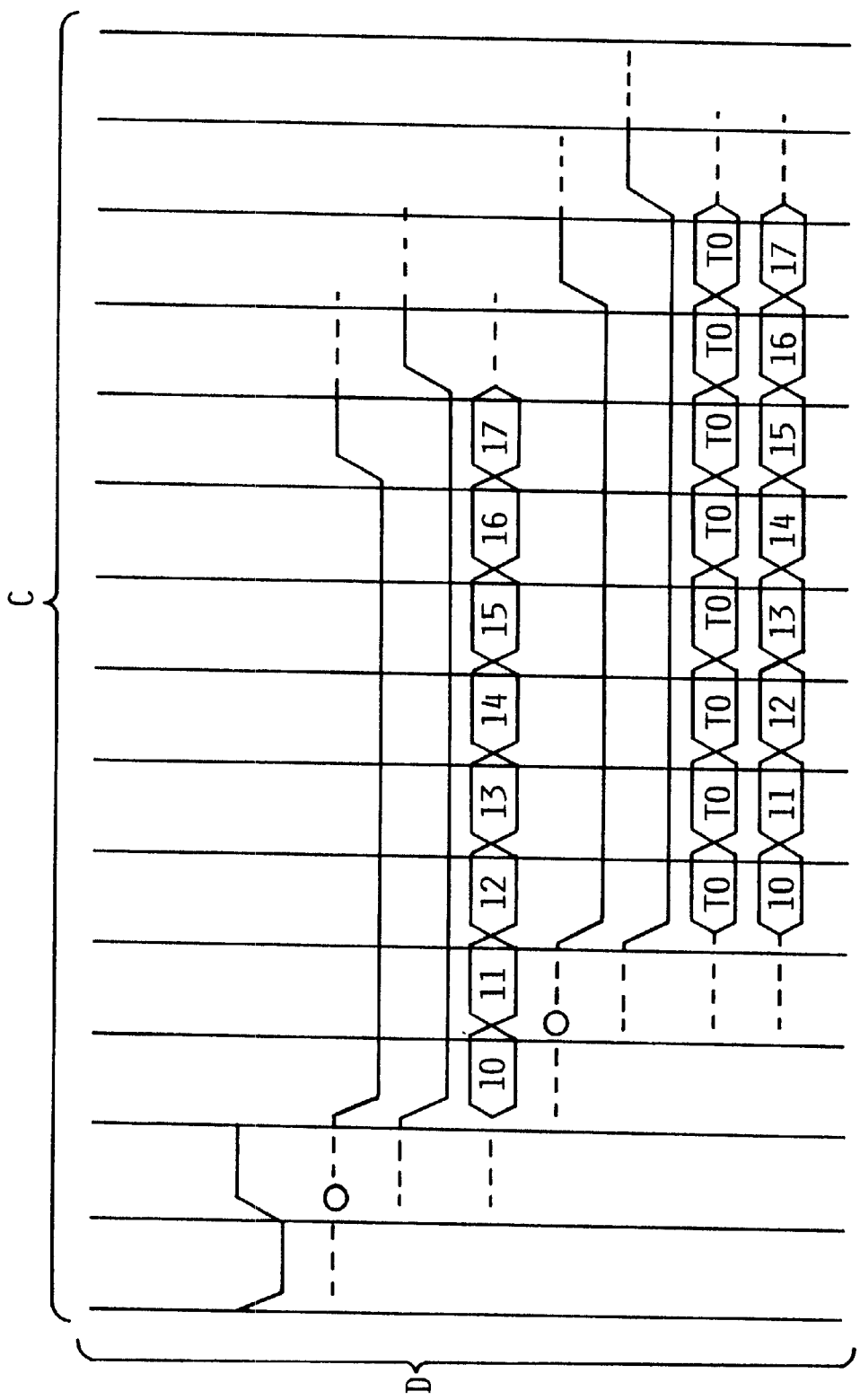

From a timing standpoint, the simplest bus activity is that which does not involve any use of the data bus, i.e., a command-only bus transfer. An example of a command-only bus transfer would be a request from a processor having a shared copy of some data in its cache to obtain exclusive rights to the data (where cache coherency obeys a M-E-S-I protocol). In this case, it is not always necessary to send the data itself, but it may be necessary to inform other processors in the event they have their own shared copies of the data in their caches. FIG. 8 is a timing diagram of bus activity for a command-only (i.e., no data) bus transfer.

At the top of FIG. 8, the global bus clock cycles are shown. By convention, the receipt of bus grant by the bus master is designated the "0" cycle. A bus transfer is initiated by the bus master pulling ABR line 701 low for one cycle 801. This is shown as cycle "-6", since it takes at least six cycles for bus grant to be propagated back to the bus master. ABR low is detected by the local ARP 210 (i.e., the ARP in the same node as the bus master). After one intervening cycle, ARP re-drives the bus request signal on RDRV_ABR line 702 at bus cycle "-4" (step 802). RDRV_ABR low is detected by ASW 212.

If the address bus is available, ASW 212 will grant the bus request by driving the appropriate bits on RDRV_ABG link 703 at bus cycle "-2" (step 803). The address bus is available if there are no other requests from the same node in the same cycle or the previous cycle (since transmission of address/command from the local node to the ASW requires two cycles), and if there are no other requests from any other requester (i.e., in a different node) in the same cycle, since only one request can be propagated out of the ASW per cycle. In the event of multiple conflicting requests from different bus masters, the ASW will choose one of the requests for bus grant and defer the other(s) to later bus cycles. Therefore, the timing shown in FIG. 8 should be viewed as minimum timing, as the ASW may wait additional cycles before granting the bus. Any of various conflict resolution schemes can be used for awarding the bus under these circumstances, such as round-robin, prioritizing based on type of command, random choice, etc.

The local ARP 210 decodes the signals received on RDRV_ABG 703. If a bus grant to one of its local processors (or I/O bus interface units) is indicated, ARP drives the corresponding ABG line 704 low at bus cycle "0" (step 804). This signal is detected by the originating bus master, which now knows that it may transmit on the bus.

By convention, the bus master must transmit its address/command/tag information on bus cycles "2 " and "3 " from receipt of bus grant; the address, etc. are transmitted to ARP 210 on local address request bus 301 (step 805). As noted, this is a half-width bus requiring two cycles to transmit all the information. ARP 210 re-sends this information to ASW 212 on remote address request bus 302 at bus cycles "4" and "5" (step 806).

ASW 212 loads the address command information received in step 806 into a single wide output register for output in a single bus cycle, and retransmits the information on remote address broadcast bus 303 at bus cycle "7" (step 907). The same address/command/tags are transmitted on all remote address broadcast buses 303 to all ARPs simultaneously. In the same cycle, the same information is transmitted to the memory subsystem on memory address broadcast bus 305. The ARPs retransmit the address/command/tag information to all attached processors and I/O interface units on the local address broadcast buses 304 at bus cycle "9" (step 808).

Each processor. I/O bus interface unit, and memory reports its 2-bit status to ASW on send status link 401 (or link 403, in the case of memory) at bus cycle "11" (step 809). ASW combines the status received from all devices to generate a system status. This system status is then broadcast from ASW to all devices on receive status link 402 (or link 404, in the case of memory) at bus cycle "13" (step 810). Each processor and I/O bus interface unit (but not memory) then generates and transmits its 3-bit response to ASW 212 on the three response lines of send response link 501 at bus cycle "15" (step 811). ASW combines the responses and broadcasts a system response on receive response link 502, also broadcasting the global response to memory on link 504 at bus cycle "17" (step 812). This completes the command-only transmission.

All responses are defined by the architecture and must occur at the predefined bus cycle. In the case of responses up to step 809, the bus cycle is fixed by the architecture. The bus cycle at which steps 810 and 811 occur is determined by values stored in a global system configuration register (step 812 occurs two steps after step 811). This flexibility permits a variable latency depending on the number and configuration of attached devices. However, once established for a particular configuration, the value does not change, and must be observed by all processors.

It will be observed that while the latency for a command-only transmission is a significant number of bus cycles, each resource is used for only one cycle at a time. (The local and remote address request buses 301, 302, are used two cycles, but there are multiple copies of these buses). Therefore, it is possible to initiate a new transmission with every bus cycle (bus masters from the same node can only initiate a new transmission every other cycle). Thus, the maximum possible throughput of the bus is one transmission per clock cycle.

FIG. 9 is a timing diagram of bus activity for a read-from-memory. The memory read transmission begins with exactly the same steps as the command-only transmission shown in FIG. 8 and explained above, i.e., steps 901–912 are performed at the same bus cycles and using the same resources as steps 801–812 explained above, the only difference being the information that is being transmitted, particularly the command.

A command to read memory necessarily requires the memory interface to go out and get data from physical memory cells, i.e., to decode an address, charge an address line, etc. The latency for all this memory subsystem activity is N bus cycles, which is represented as step 913. I.e., step 913 is not bus activity, but memory subsystem activity which begins after bus cycle "7", when the memory subsystem receives an address and command from the ASW on memory address broadcast bus 305. The bus architecture is not dependent on any particular memory technology, and thus the number N may vary. However, if N were less than the 10 cycles required to complete steps 909–912, it would be necessary for the memory subsystem to wait until these steps were completed.

When the memory subsystem is ready to transmit the requested data, it requests the data bus from DSW 211 by holding the memory data bus request line 721 low at bus cycle "N+4" (step 914). Since data is only transmitted to the bus master, which is known to the memory subsystem from the tag data, the memory subsystem only signals on the DBR line 721 going to the DSW for the bus master's local node. An additional steering signal (not shown) is required to request a particular local data bus within the bus master's local node. Since data is read from one memory subsystem (but not both), only one of the DBR lines 721 going into the DSW for the bus master's local node is held low in response to the read data request. Other lines and buses may concurrently be used for other data transfers.

If the data bus is available, the DSW 211 responds by holding the memory data bus grant line 722 low at bus cycle "N+6" (step 915). Only the DBG line 722 going to the requesting memory subsystem is held low. The data bus is available if both the local data bus 601 going between the DSW and the bus master, and the remote data bus 602 going between DSW and the memory subsystem requesting bus grant, will be available at the time of transmission.

The memory subsystem then transmits the data along with the tags to DSW on remote data bus 602, beginning at bus cycle "N+8" (step 916). Sixteen bytes of data are transmitted with each bus cycle, the data bus being 16 bytes wide. The tag is repeated with each bus cycle. A single transmission can last a maximum of eight cycles (maximum of 128 bytes of data). To transmit more data, the bus master must make multiple requests for the bus. While transmitting data, the sender holds a data valid (DVal) line low. The sender also holds a data busy (DBusy) line low, releasing it one cycle before end of transmission to let the receiver know that transmission is about to end.

DSW 211 retransmits the data received from the memory subsystem to the bus master on the local data bus 601 servicing the bus master, beginning at bus cycle "N+10" (step 917). I.e., data is retransmitted on local data bus 601 two bus cycles after transmission on remote data bus 602. The tag is also repeated each cycle, and DVal and DBusy are held low as before. This completes the memory read transmission.

FIG. 10 is a timing diagram of bus activity for a write-to-memory from the bus master (either a processor 101 or I/O bus interface unit 105, in which case data is coming from some I/O unit, such as a storage device). The memory write transmission begins with exactly the same steps as the command-only transmission shown in FIG. 8 and explained above, i.e., steps 1001–1012 are performed at the same bus cycles and using the same resources as steps 801–812 explained above, the only difference being the information being transmitted, particularly the command.

When the bus master receives the bus grant at cycle "0" (step 1004), it knows that it will be able to begin transmitting the address and command at bus cycle "2", and that the memory subsystem will receive this information at bus cycle "7", these being predefined by the bus architecture. Since there is at least this much latency for data to reach the memory subsystem, it can immediately request the data bus. The bus master requests the data bus by holding local data bus request (DBR) line 711 low at bus cycle "2" (step 1013). If the data bus is available, the DSW 211 responds by holding the local data bus grant (DBG) line 712 for the bus master low at bus cycle "4" (step 1014). The data bus is available if both the local data bus 601 going between the bus master and the DSW, and the remote data bus 602 going between the DSW and the memory subsystem where the data will be stored, will be available at the time of transmission.

The bus master then transmits the data along with the tags to DSW 211 on local data bus 601, beginning at bus cycle "6" (step 1015). Sixteen bytes of data are transmitted with each bus cycle, the tag being repeated with each bus cycle. As in the case of a read, data transmission is always limited to eight cycles (maximum of 128 bytes of data). While transmitting data, the bus master holds a data valid (DVal) line low. The bus master also holds a data busy (DBusy) line low, releasing it one cycle before end of transmission to let the DSW know that transmission is about to end.

DSW 211 retransmits the data received from the bus master to the memory subsystem on the remote data bus 602 which runs to the memory subsystem where the data will be stored, beginning at bus cycle "48" (step 1016). Thus, the first 16 bytes of data reach the memory subsystem one bus cycle after the address and command arrive. The tag is also repeated each cycle, and DVal and DBusy are held low as before. This completes the memory write transmission.

The memory bus architecture also supports data transfer between processors 101 and/or I/O bus interface units 105. There are three flavors of such transfer, each with its own timing. In one case, the two devices are in the same local node 201, but not on the same local data bus 601. In a second case, the two devices are in the same local node and are on the same local data bus 601. In the third case, the two devices are in different local nodes. Such a data transfer might occur, for example, as a result of an attempt to read from memory, where another processor has a more current version of the data to be read in its cache, or might be a read of data from an I/O device.

Figure 11A:
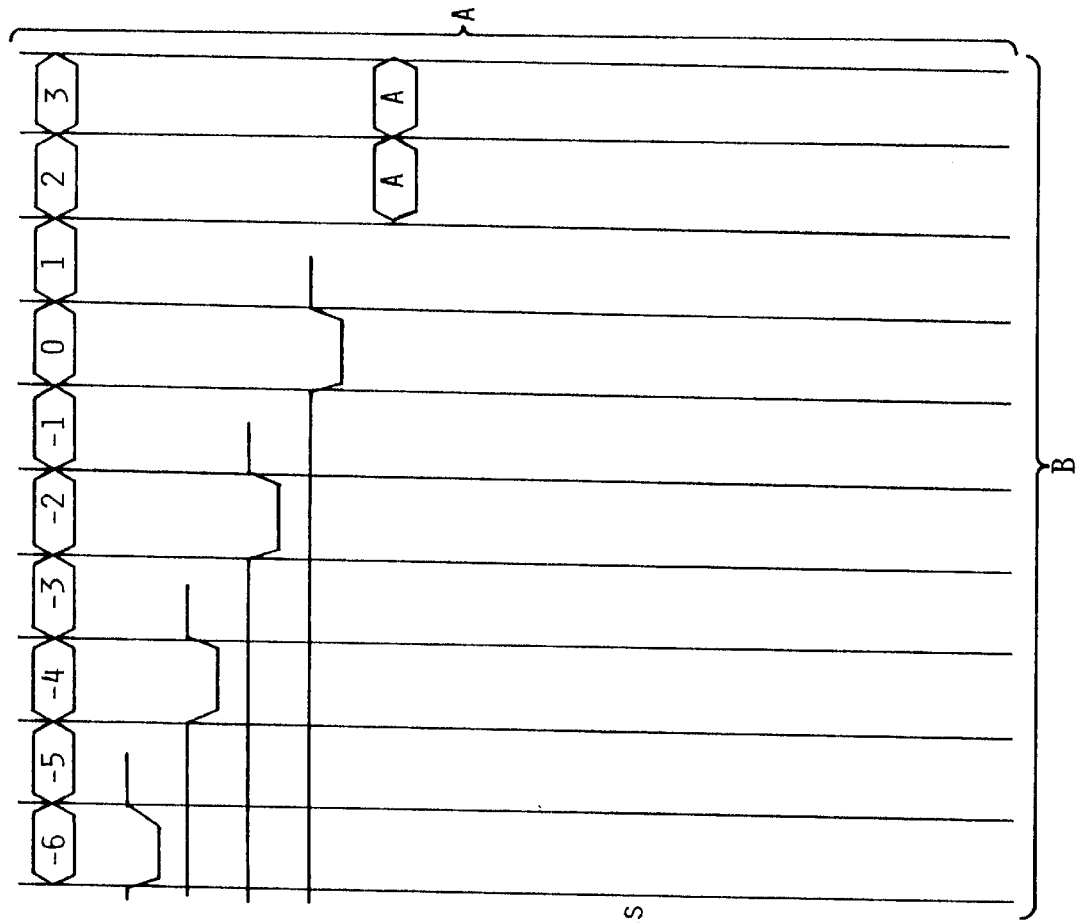
FIG. 11 is a timing diagram of bus activity for a read-from-device, where the data source and bus master are in the same local node but note on the same local data bus, according to the preferred embodiment.
Figure 11B:
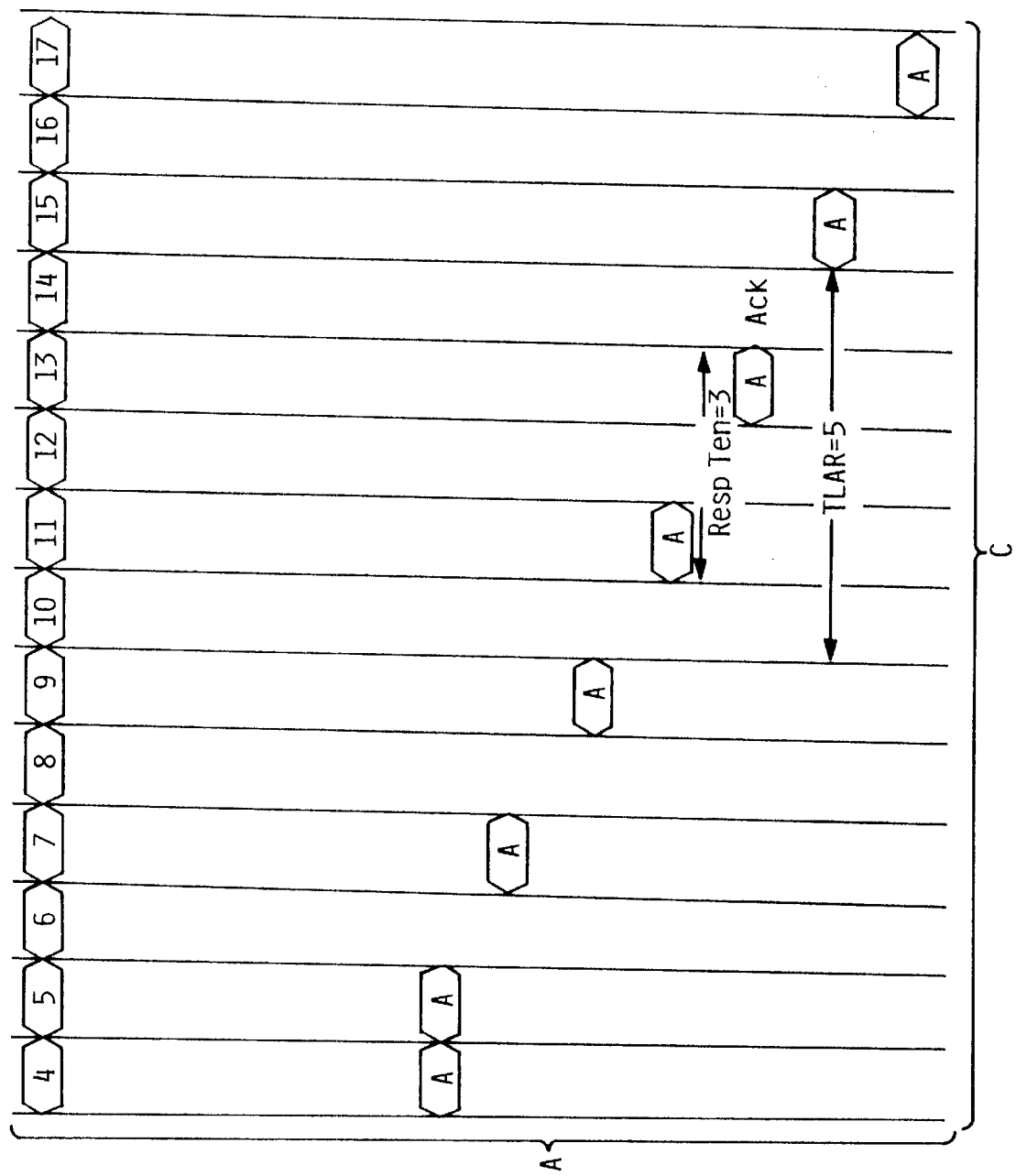
Figure 11D:
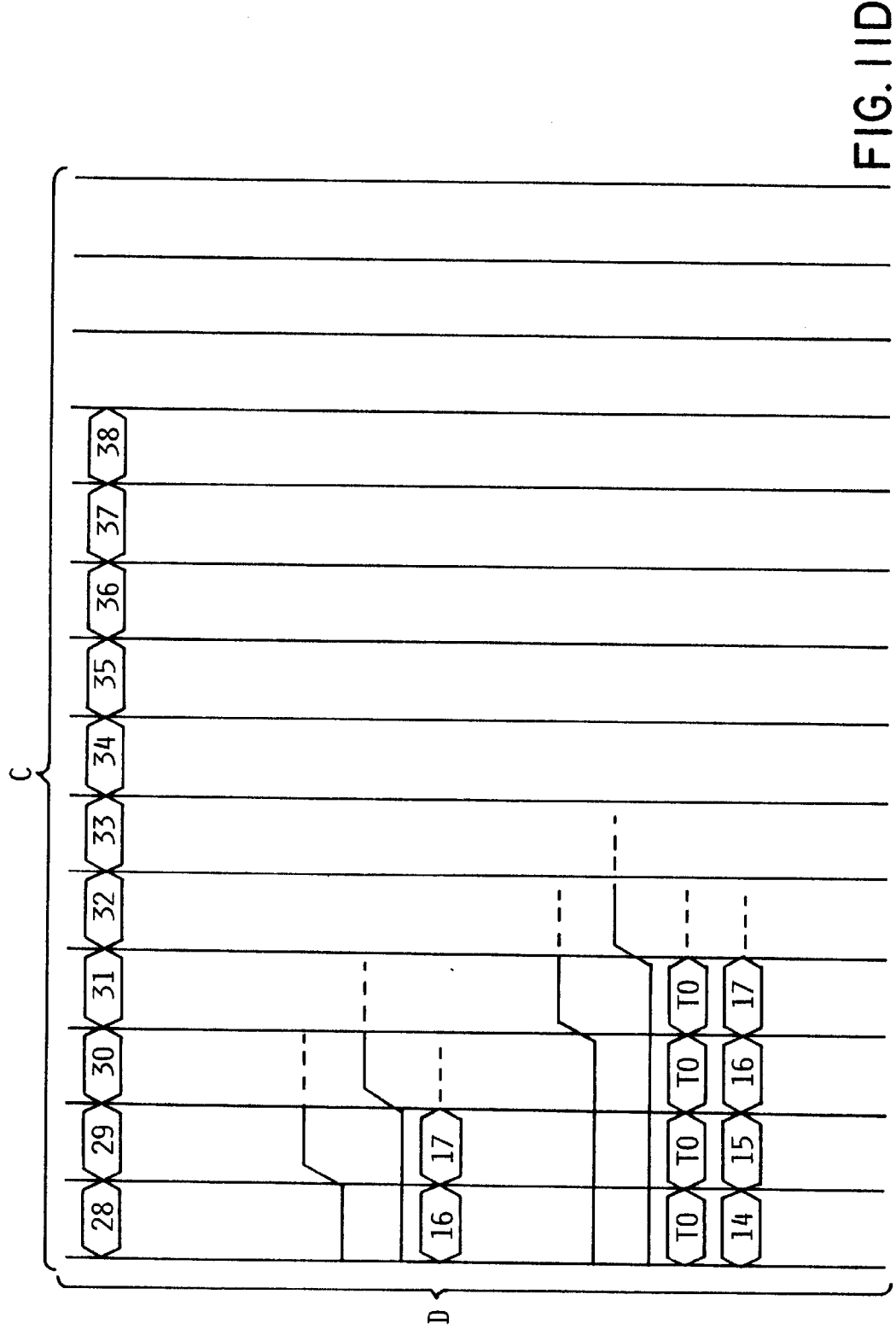
Figure 12A:
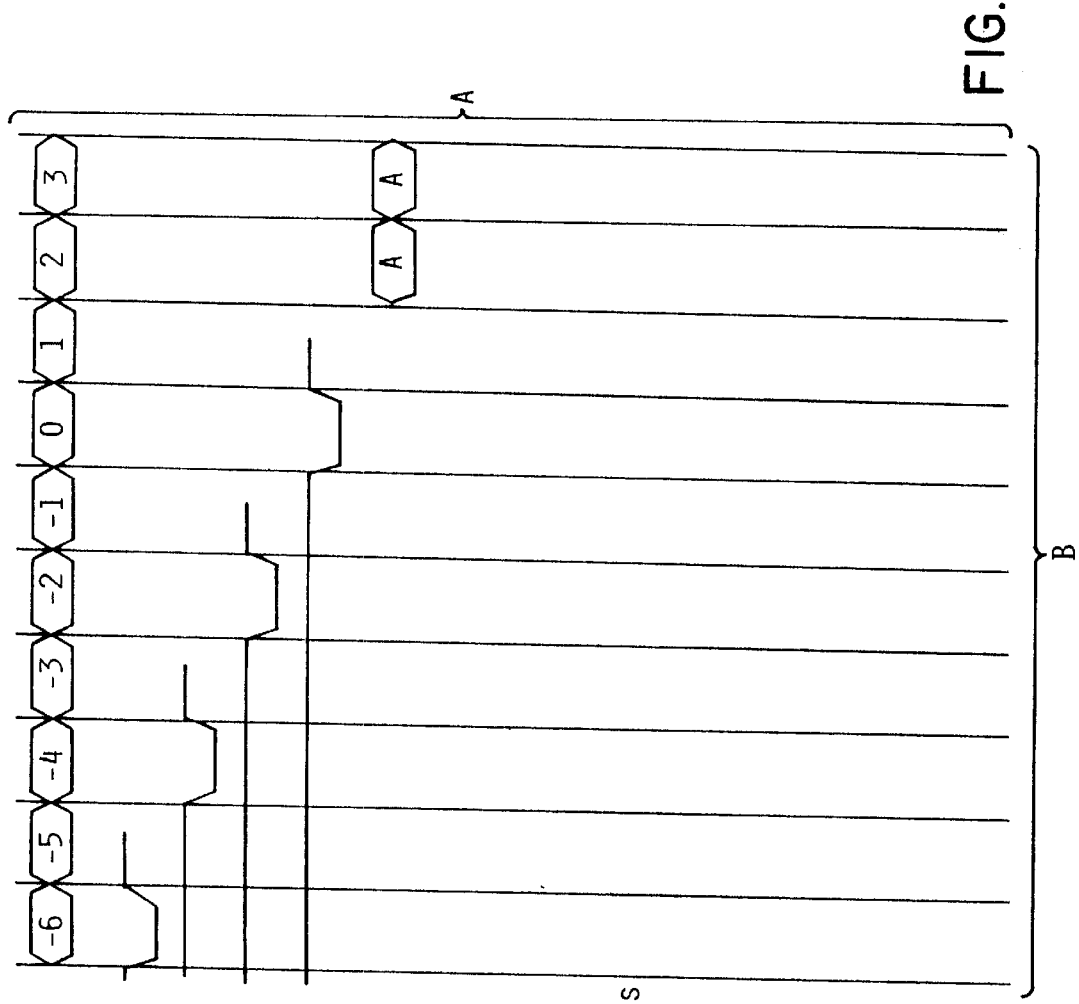
FIG. 12 is a timing diagram of bus activity for a read-from-device, where the data source and bus master are in different local nodes, according to the preferred embodiment.
Figure 12B:
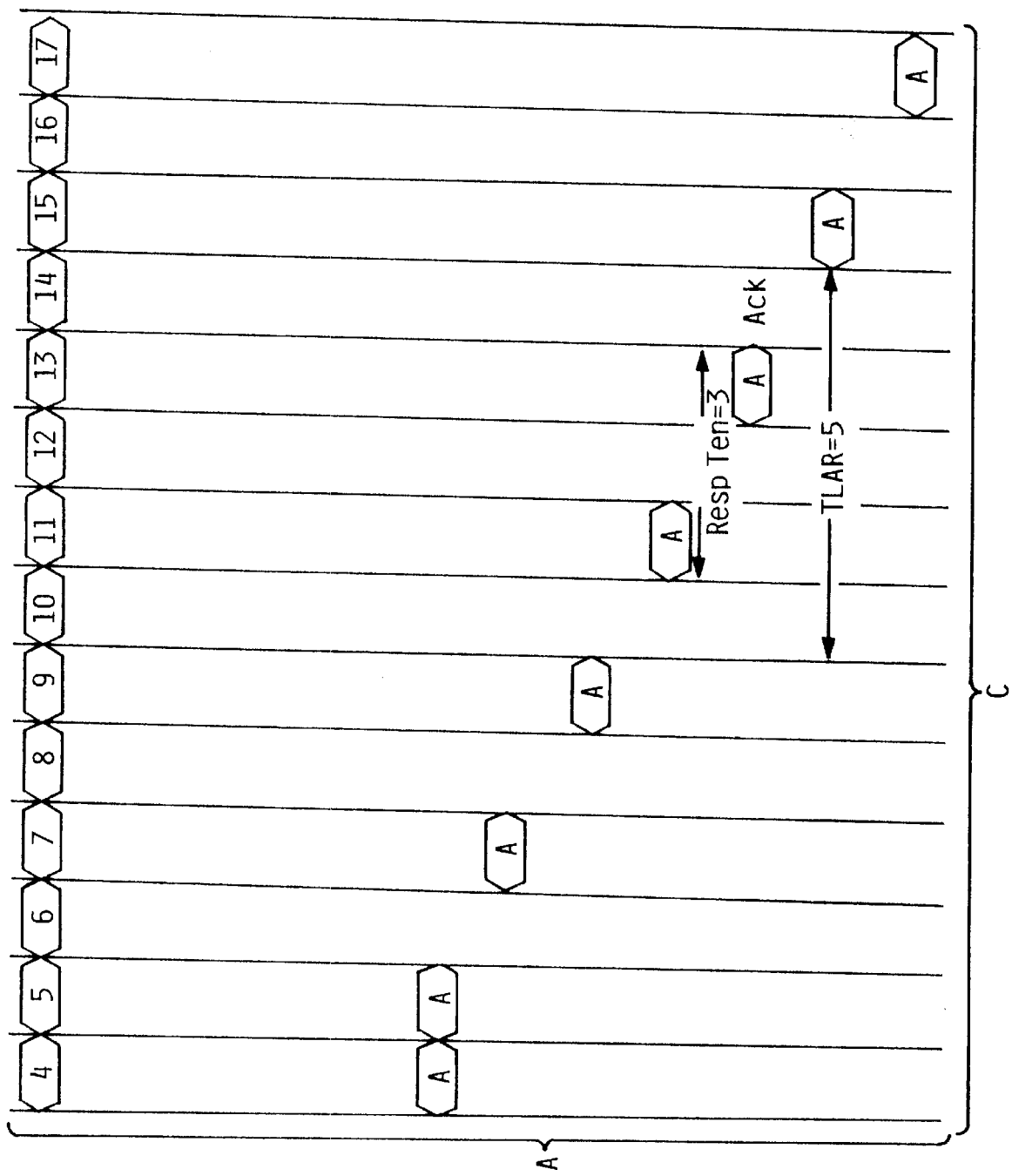
Figure 12C:
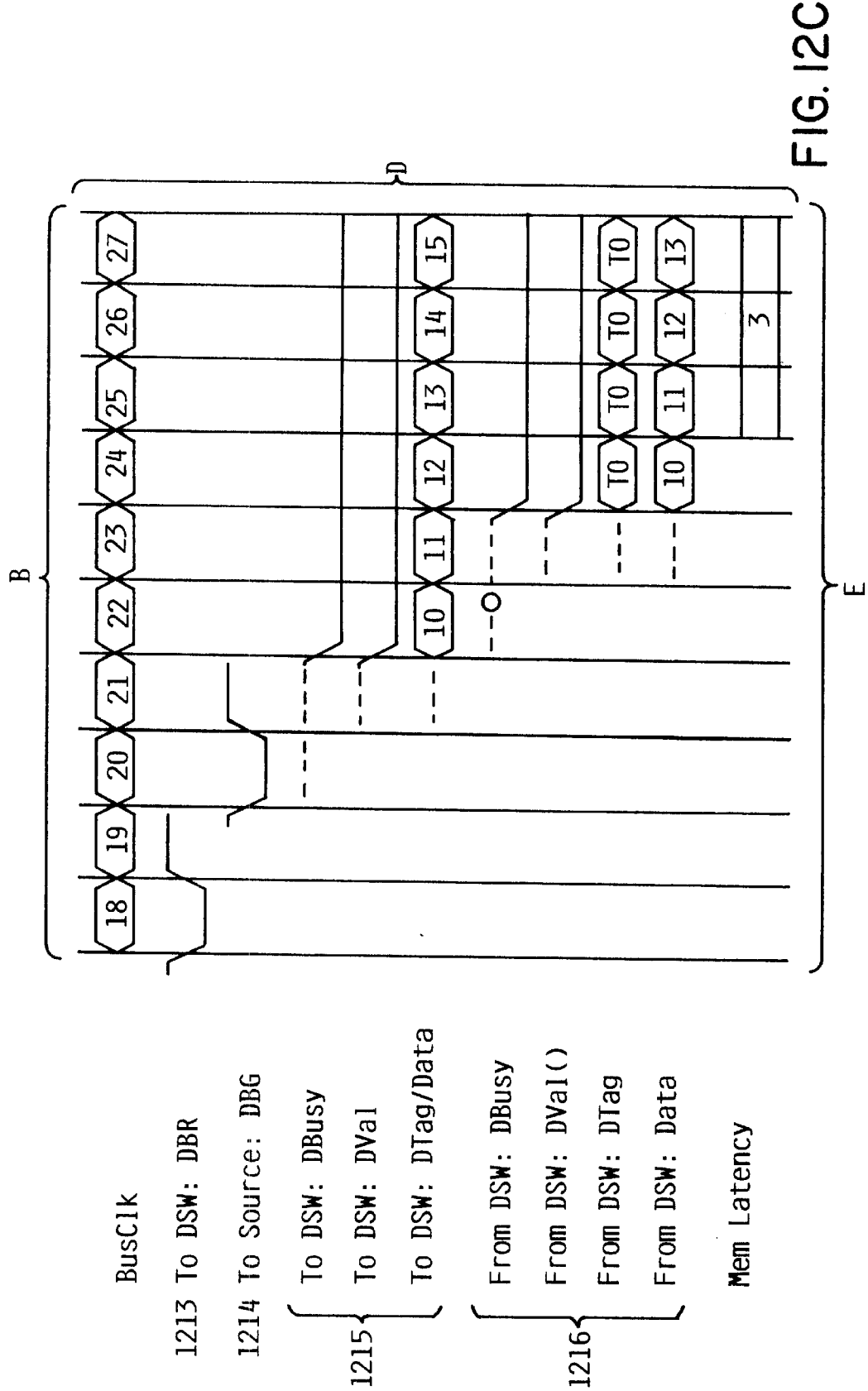
Figure 12D:
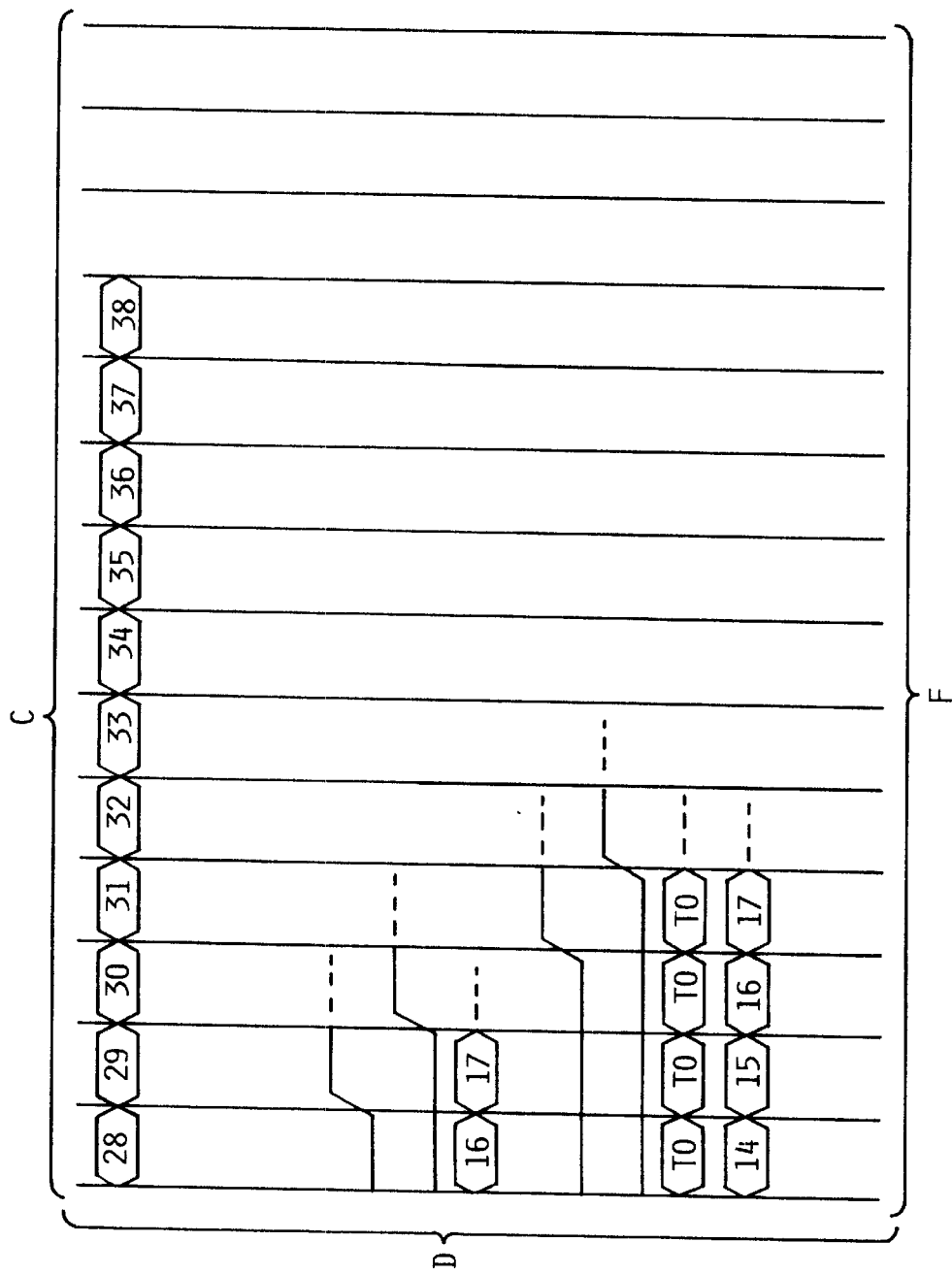
Figure 12F:
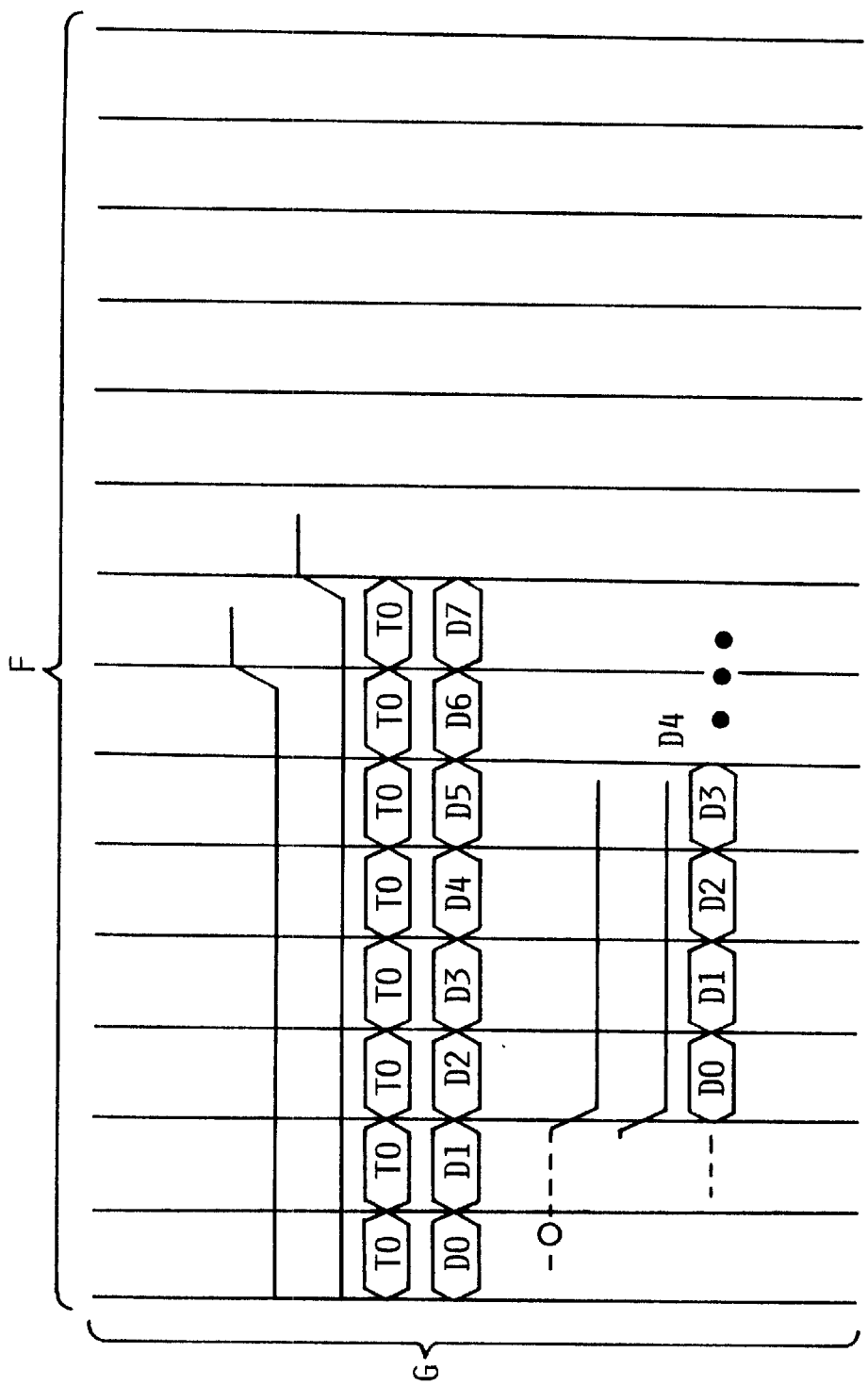
Figure 13A:
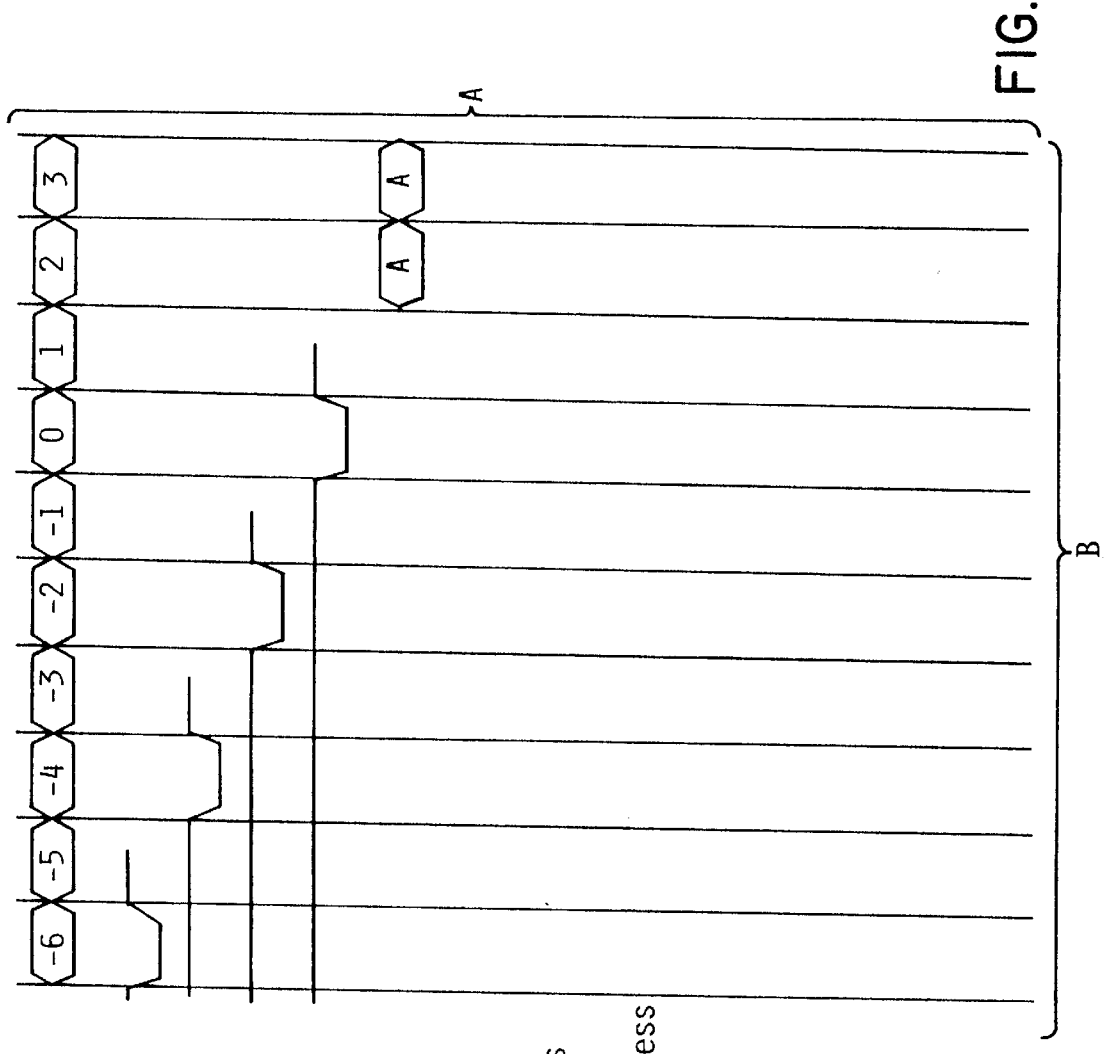
FIG. 13 is a timing diagram of bus activity for a read-from-device, where the data source and bus master are on the same local bus, according to the preferred embodiment.
Figure 13B:
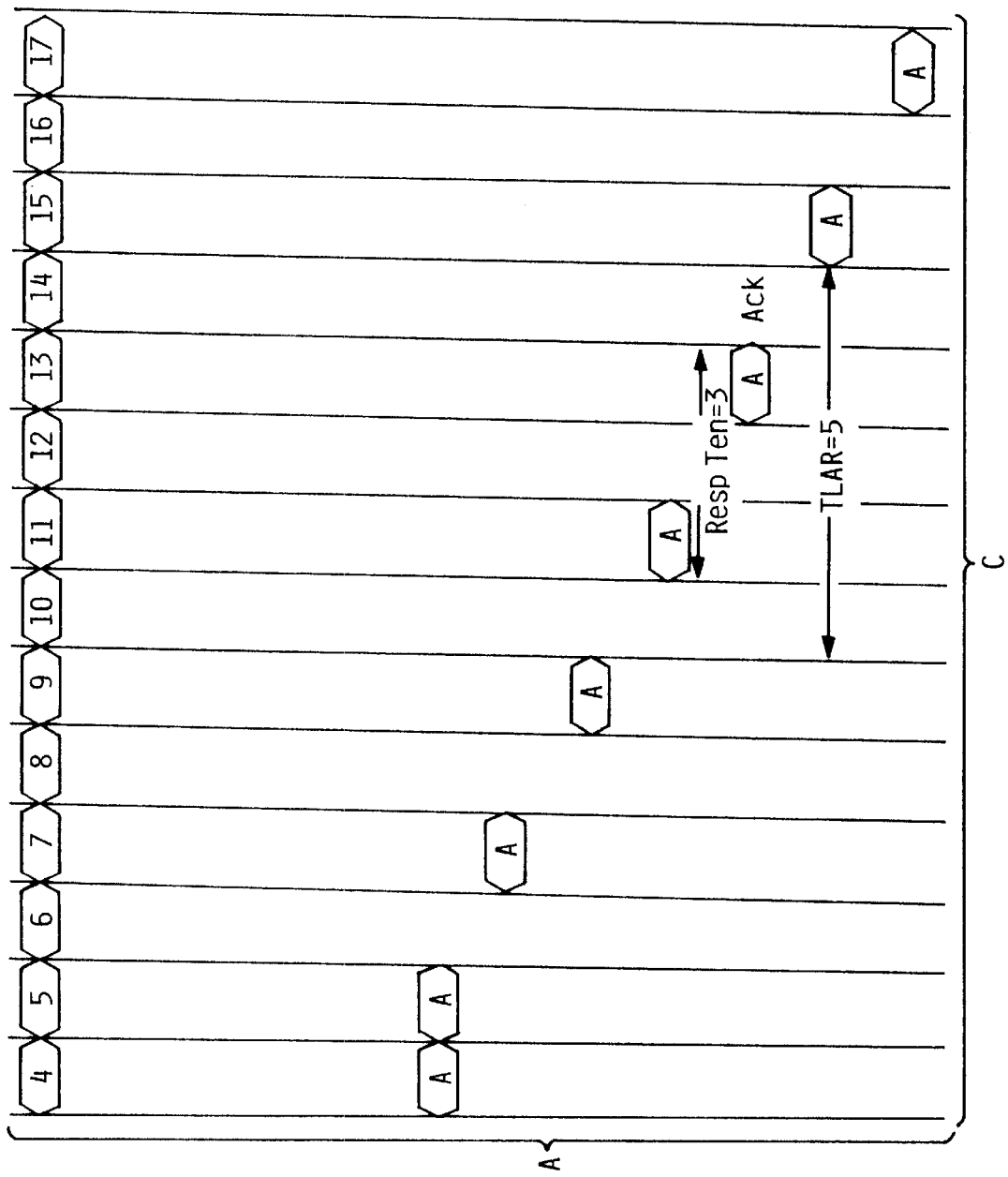
Figure 13C:
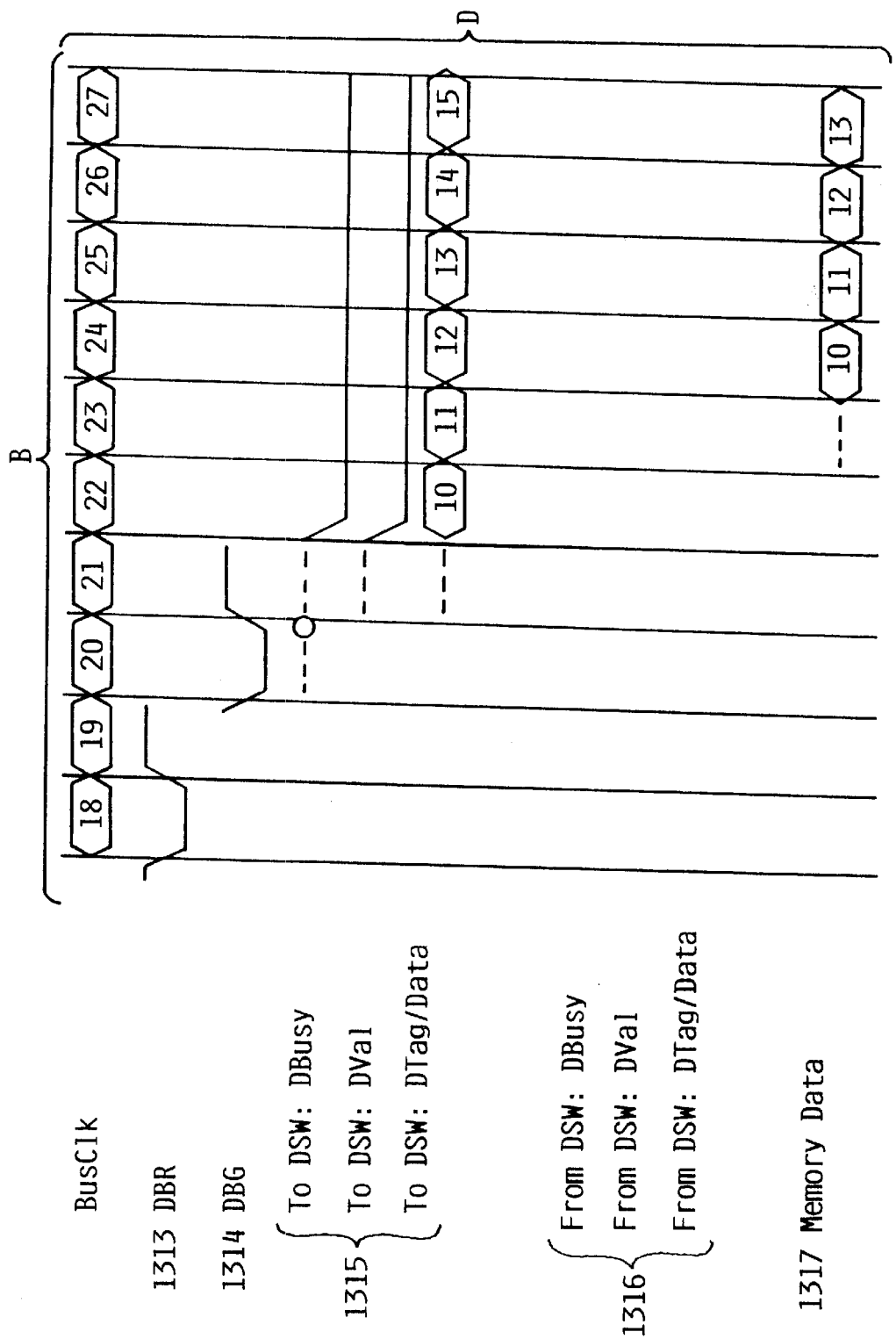
Figure 13D:
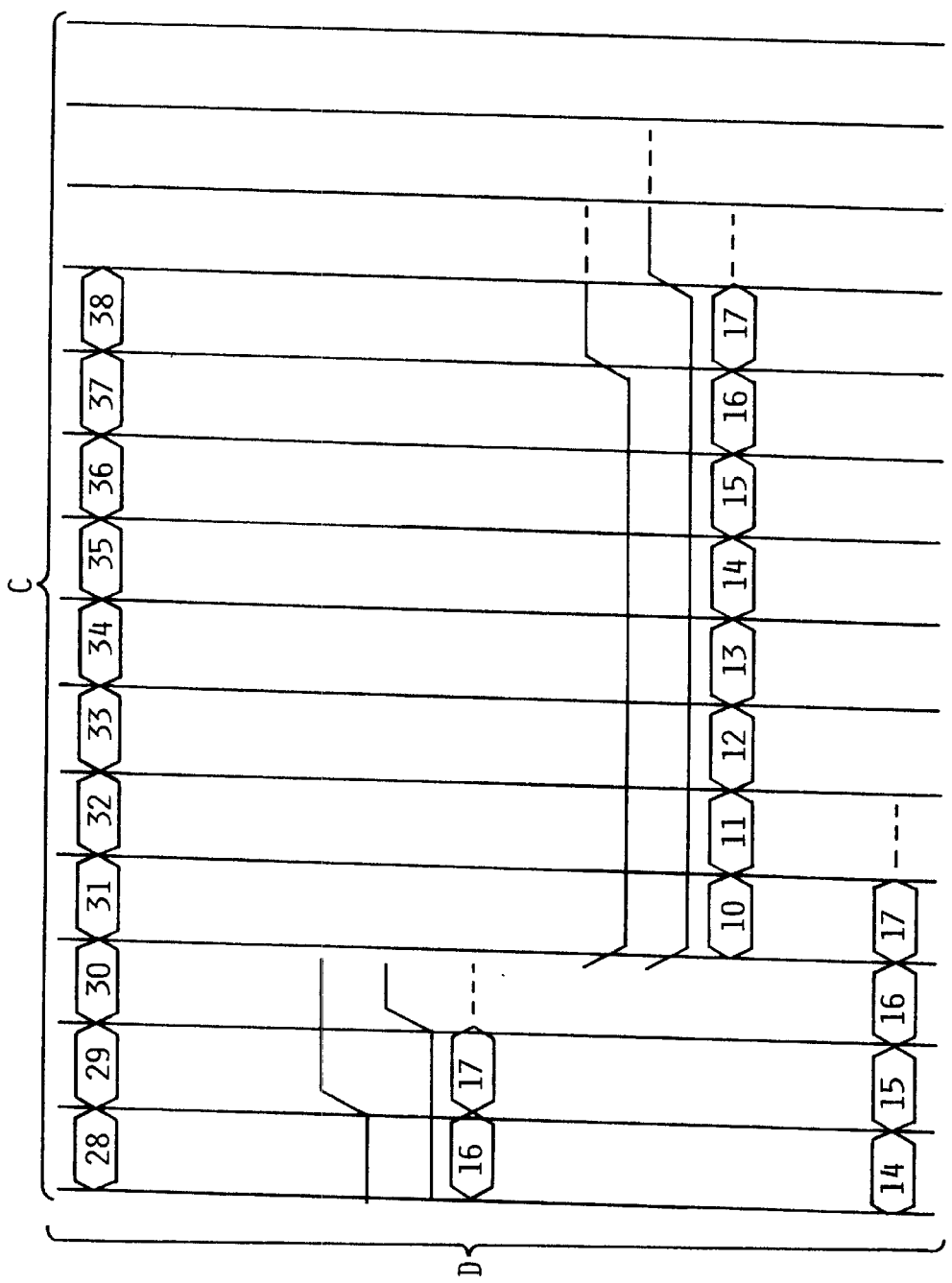
Figure 14A:
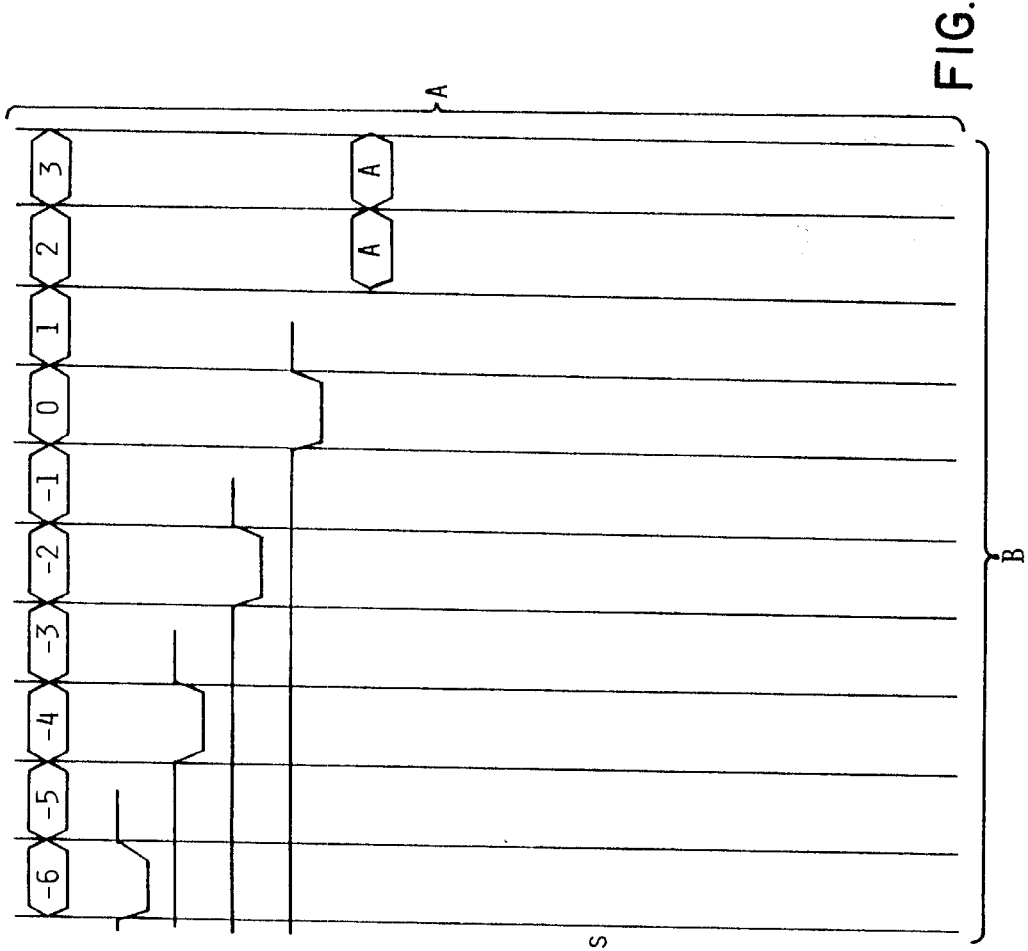
FIG. 14 is a timing diagram of bus activity for a write-to-device, according to the preferred embodiment.
Figure 14B:
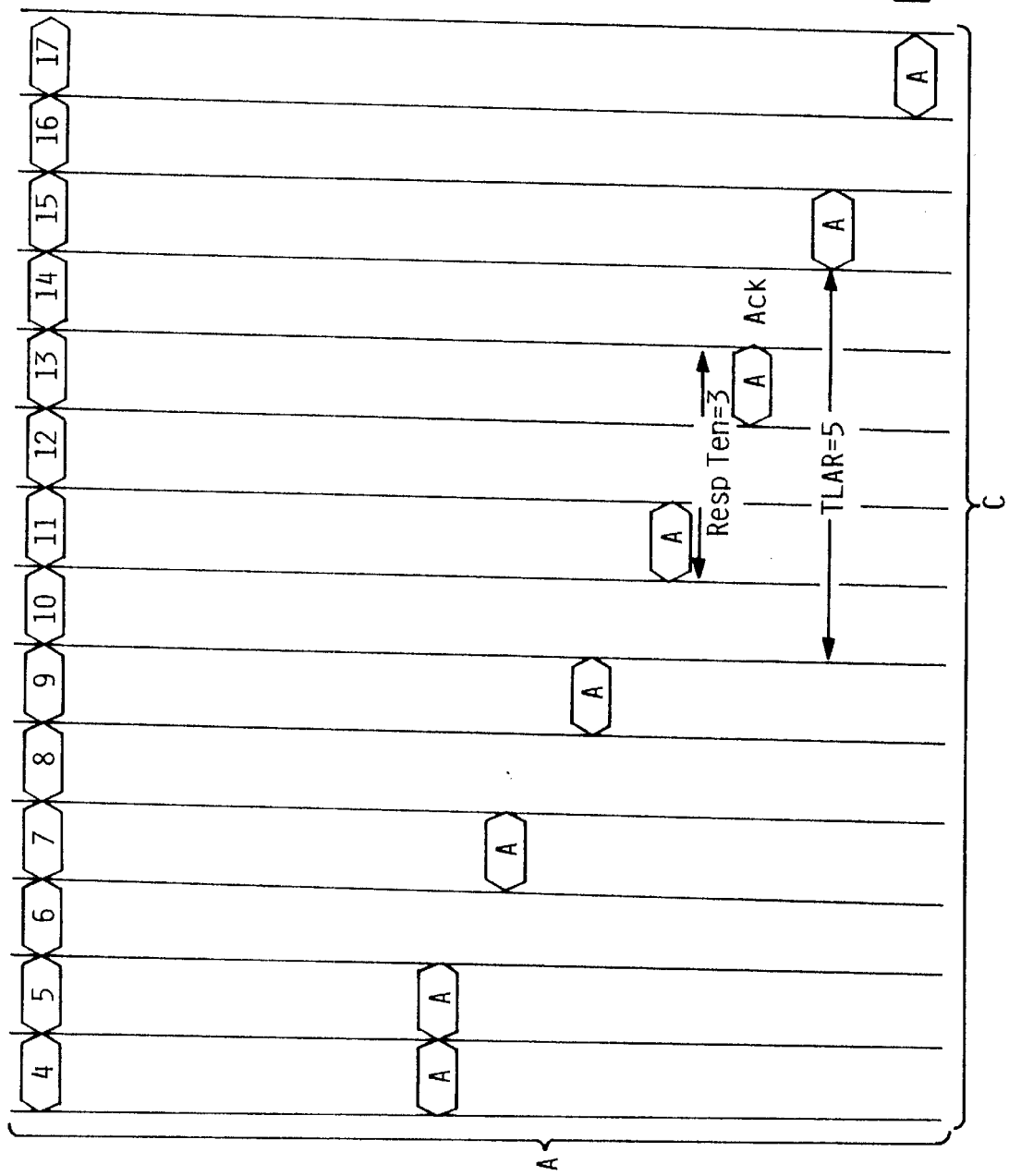
Figure 14C:
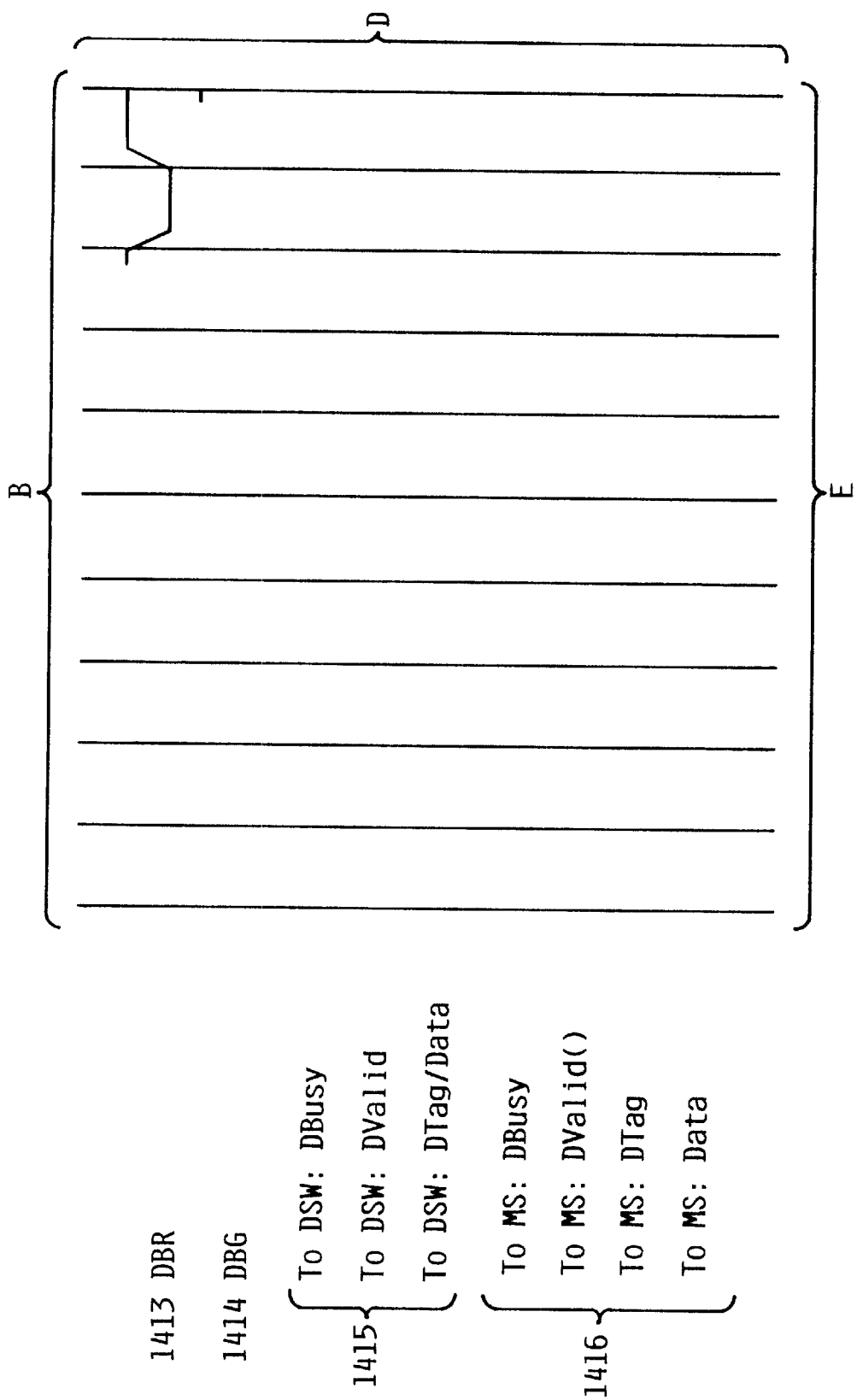
Figure 14D:
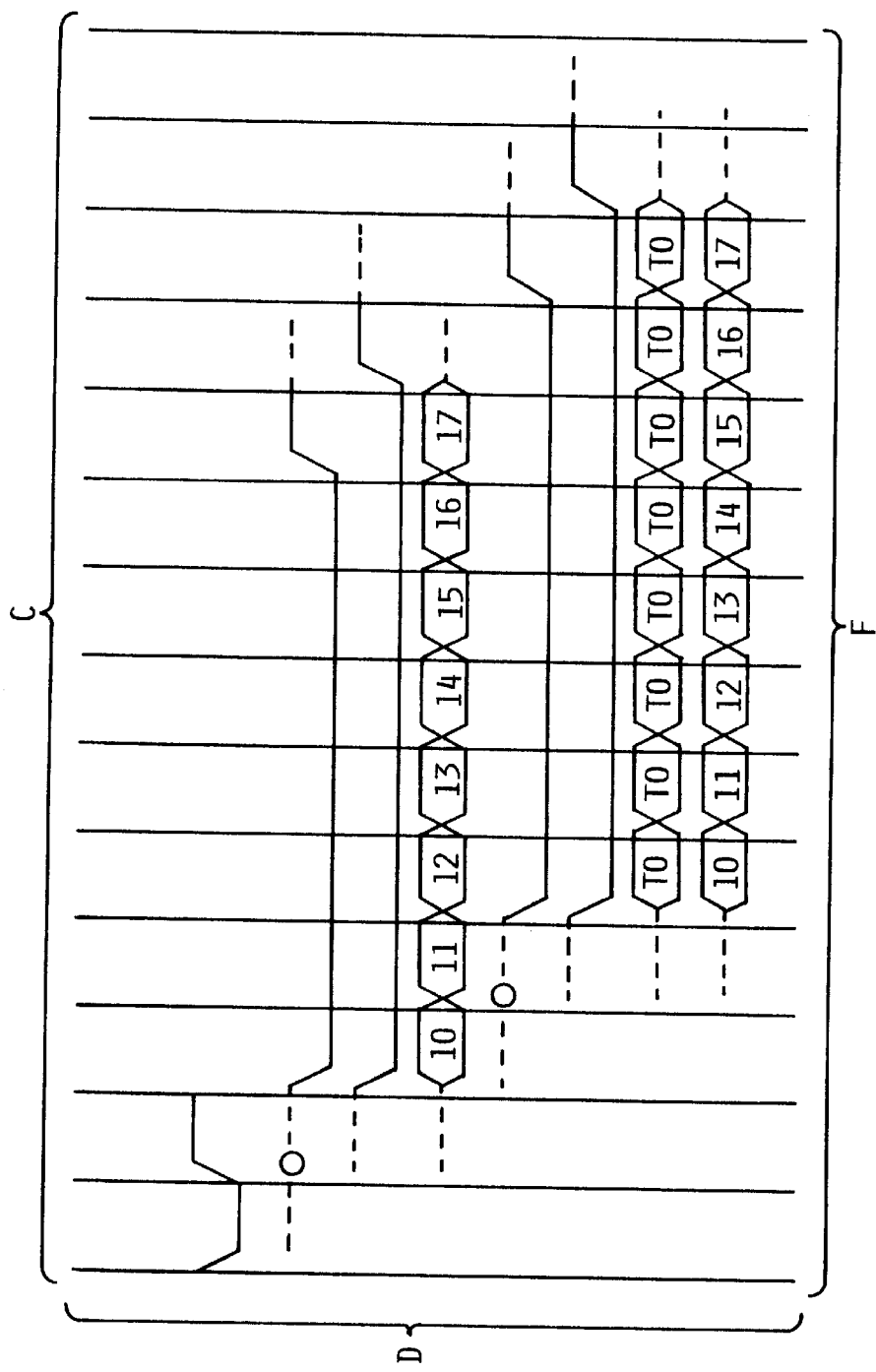
Figure 14E:
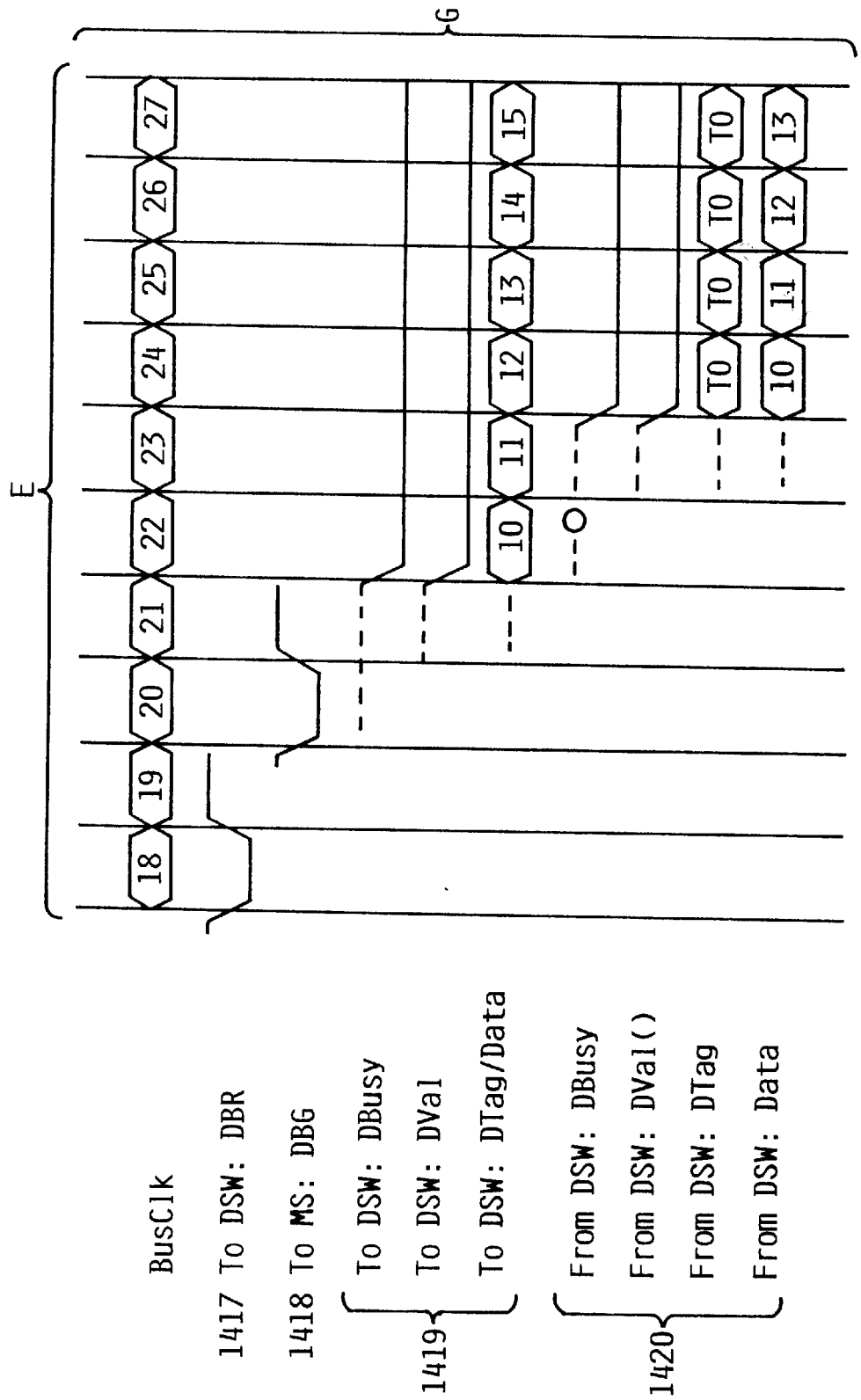
Figure 14F:
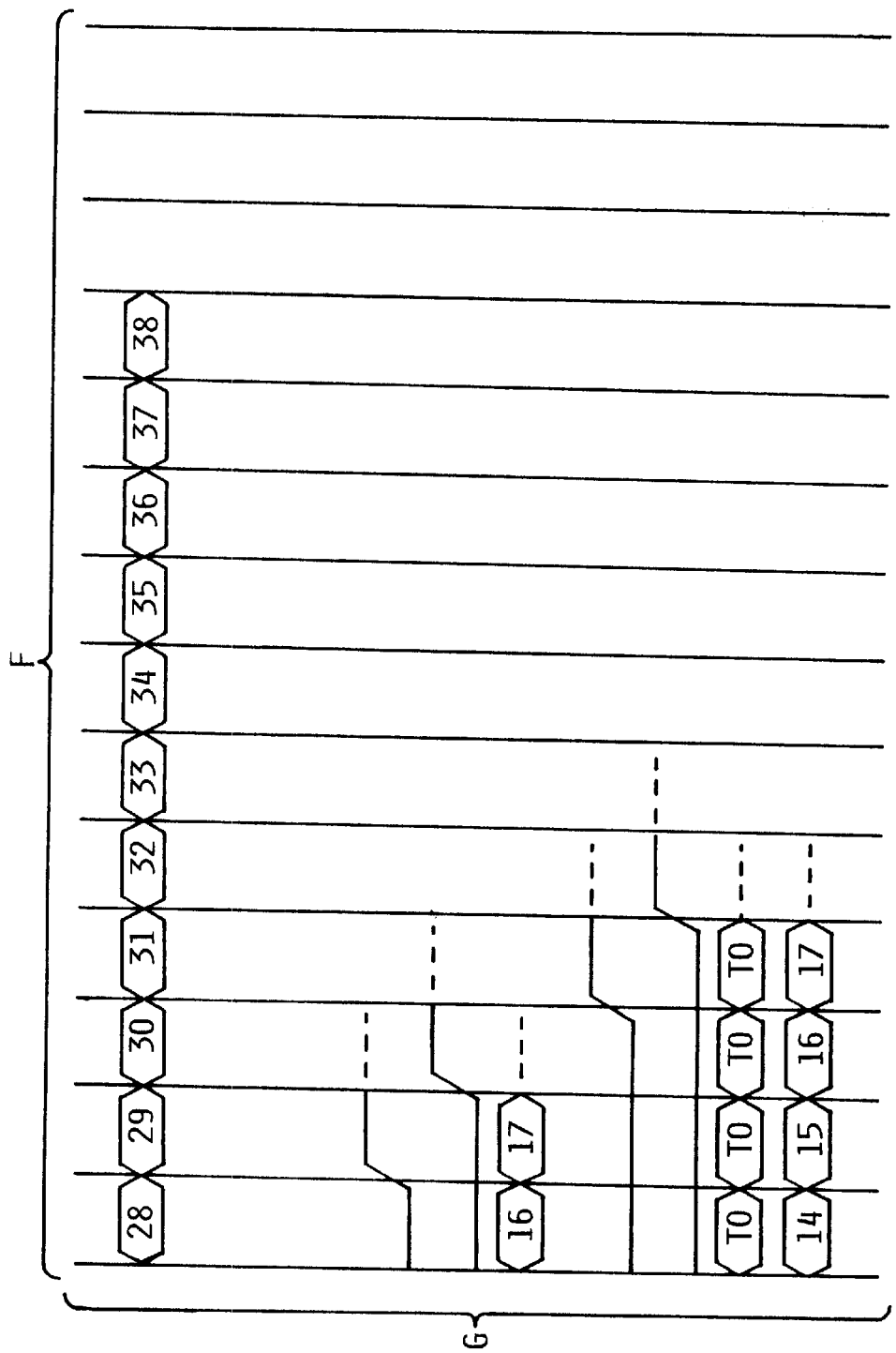

FIG. 11 is a timing diagram of bus activity for a read-from-device, where the device which is the source of the data is in the same local node as the bus master, but is not on the same local data bus 601 (referred to as a read with local intervention). In the computer system of the preferred embodiment, this type of operation occurs when the bus master attempts to read from memory, but another device (processor) intervenes because it has a more current copy of the data in its cache.

Not surprisingly, the read-from-device begins in exactly the same manner as a read-from-memory, and from the perspective of the bus master, it is a generic read. I.e., steps 1101–1112 are performed at the same bus cycles and using the same resources as steps 901–912 (and 801–812), explained above. I.e., the bus master sends out only an address, and does not necessarily know where the data is located. After all the units have responded, and status and response have been broadcast by ASW 212, the devices will know whether the data resides in memory, or some more current copy of the data is in another processor. In particular, the source device will know it is the source device (although other devices will not necessarily know which is the source device) because the broadcast status/response having highest priority came from it.

After receiving status, the data source device requests the data bus by holding its local data bus request (DBR) line 711 low (step 1113). This is shown in FIG. 11 at bus cycle "18", it being understood that this is the earliest such an event may occur, and that the data source device may be busy with other data transfers and unable to request the bus immediately.

If the data bus is available, the DSW 211 responds by holding the corresponding local data bus grant (DBG) line 712 low at bus cycle "20" (step 1114). The data bus is available if all three of the following will be available at the time of transmission: the local data bus 601 going between the data source device and the DSW, the local data bus 601 going between the DSW and the bus master, and the remote data bus 602 going between the DSW and the memory subsystem in which the data resides. The reason all three must be available is that data in memory will be updated at the same time.

The source device then transmits the data along with the tags to DSW on its local data bus 601, beginning at bus cycle "22" (step 1115). Sixteen bytes of data and the tag are transmitted with each bus cycle. While transmitting data, the source device holds a data valid (Dval) and data busy (Dbusy) lines low, releasing Dbusy one cycle before transmission end.

DSW 211 retransmits the data received from the data source device to the bus master on the local data bus 601 servicing the bus master, beginning at bus cycle "24" (step 1116). I.e., data is retransmitted on local data bus 601 going to the bus master two bus cycles after transmission is received on local data bus 601 from the data source. The tag is also repeated each cycle, and DVal and DBusy are held low as before. On exactly the same bus cycles, the DSW 211 retransmits the same data and tags to the memory subsystem in which the unmodified data resides so that the memory subsystem may update the data. This completes the transmission.

FIG. 12 is a timing diagram of bus activity for a read-from-device, where the device which is the source of the data is in a different local node (referred to as remote intervention). There is no data bus running directly between DSWs in different local nodes. In order to perform this type of a data transfer, data is sent to the memory controller and retransmitted, as described below. Depending on the type of transmission, the memory controller may or may not store the data in memory after it receives the data; however, from the standpoint of bus timing, this activity is irrelevant, because the memory controller does not wait for the data to be stored in the memory subsystem before retransmitting it to the bus master. The read with remote intervention transmission begins with exactly the same steps as the command-only transmission shown in FIG. 8 and explained above, i.e., steps 1201–1212 are performed at the same bus cycles and using the same resources as steps 801–812 explained above, the only difference being the information that is being transmitted, particularly the command.

After status has been broadcast, the devices will know which one is to send the requested data. The data source device therefore requests the data bus by holding its local DBR line 711 low at or after bus cycle "18" (step 1213). If the data bus is available, the DSW 211 responds by holding the corresponding local data bus grant (DBG) line 712 low at bus cycle "20" (step 1214). The data bus is available if both the local data bus 601 going between the data source device and the DSW, and the remote data bus 602 going between the DSW and the memory subsystem on which the data resides, will be available at the time of transmission. In some cases, e.g., a transfer from an I/O device to a processor, the data is not stored in memory, the memory subsystem acting only as a data switch and buffer. In such cases it is possible to send the data to either memory subsystem. As long as the data bus to either subsystem is available, the data will be sent. If both buses are available, a priority scheme will determine which bus to use.

The source device then transmits the data along with the tags to its local DSW on its local data bus 601, beginning at bus cycle "22" (step 1215). Sixteen bytes of data and the tag are transmitted with each bus cycle. While transmitting data, the source device holds a data valid (Dval) and data busy (Dbusy) lines low, releasing Dbusy one cycle before transmission end. Up to this point, the transfer is essentially the same as the local intervention data transfer described with respect to FIG. 11.

The DSW 211 local to the data source retransmits the data received to one of the memory subsystems on remote data bus 602, beginning at bus cycle "24" (step 1216). I.e., data is retransmitted on remote data bus 602 to the memory subsystem two bus cycles after transmission is received on local data bus 601 from the data source. The tag is also repeated each cycle, and DVal and DBusy are held low as before.

The data received is buffered in the memory subsystem for transmission to the DSW 211 local to the bus master. Ideally, this retransmission begins after a 3-cycle latency. However, the 3-cycle latency is a minimum latency. The memory subsystem must first obtain the bus going to the bus master, and if this bus is busy the latency could be longer. The memory subsystem requests the data bus to the bus master by lowering its DBR line 721 to the DSW 211 local to the bus master, depicted in FIG. 12 at cycle "24", which is the earliest it may occur (step 1217). If the data bus is available, the DSW grants the bus by lowering the DBG line 722 to the memory subsystem (step 1218). The data bus is available if both the remote data bus 602 running between the memory subsystem and the DSW 211 local to the bus master is available and the local data bus 601 running between the DSW 211 and the bus master is available.

After receiving data bus grant, the memory subsystem transmits the data held in its buffer along with the tags to the DSW 211 local to the bus master on remote data bus 602, beginning at bus cycle "28" (step 1219). As in the case of other data transmissions, the memory subsystem holds DVal and DBusy low, releasing DBusy one cycle before end of transmission.

DSW 211 retransmits the data received from the memory subsystem to the bus master on the local data bus 601 which services the bus master, beginning at bus cycle "30" (step 1220), also repeating the tag and holding DVal and DBusy low as before. This completes the read with remote intervention.

FIG. 13 is a timing diagram of bus activity for a read-from-device, where the device which is the source of the data is not only in the same local node as the bus master, but is also on the same local data bus 601. This type of operation is referred to as a local echo, and only occurs between two processors 101. The device read transmission begins with exactly the same steps as the read with local intervention shown in FIG. 11 and explained above, i.e., steps 1301–1314 are performed at the same bus cycles and using the same resources as steps 1101–1114 explained above.

In the read with local intervention described above with respect to FIG. 11, the data comes into the DSW on one local data bus 601 and goes out on another, making it possible to use both buses in an overlapping manner, re-transmitting data two cycles after initial transmission. This is not possible in the case of the local echo, because only one local data bus 601 is available for use. Although this is a bidirectional bus serving two processors, the bus architecture is designed so that each processor will ignore any transmission from the other. A separate DVal line runs from DSW 211 to each processor. When the source lowers its DVal line, this is seen only by DSW 211, and not the other processor, and hence the data being transmitted by the source is initially ignored. The DSW must retransmit the data and lower DVal so that the bus master will receive it.

As shown in FIG. 13, the data source begins transmission of the data with tag on local data bus 601 at bus cycle "22", and in the example case of an 8-cycle transmission (eight cycles being the maximum permitted in the architecture), completes transmission on bus cycle "29" (step 1315). In this transmission, the data source device lowers DVal and DBusy going to the DSW.

The DSW must wait until all the data is transmitted by the data source before it can use the same local data bus 601. Beginning with bus cycle "31", it retransmits the data received with the tag to the bus master on local data bus 601 (step 1316). In this transmission, the DSW lowers DVal and DBusy going to the bus master.

Since the updated data from a processor's cache should be simultaneously updated in memory, DSW 211 concurrently transfers the data to the appropriate memory subsystem on remote data bus 602 (step 1317). Note that this transfer begins at bus cycle "24". I.e., it is not necessary to wait until all the data from the source device is received, because it is being retransmitted to memory on a physically separate bus connection.

FIG. 14 is a timing diagram of bus activity for a write-to-device. This is used, e.g., to write from a processor to an I/O interface unit, and always occurs across nodes. Like the remote intervention transaction, a write-to-device is accomplished by sending the data first to a memory subsystem controller, which then re-transmits it to the destination device (without storing the data in the memory subsystem). The write-to-device therefore begins with exactly the same steps as the write-to-memory shown in FIG. 10 and explained above, i.e., steps 1401–1416 are performed at the same bus cycles and using the same resources as steps 1001–1016 explained above.

After status/response have been broadcast the memory subsystem will know where to send the requested data. The memory subsystem therefore requests the data bus going to the local node of the destination device by holding the appropriate DBR line 721 low at or after bus cycle "18" (step 1417). If the data bus is available, the DSW 211 responds by holding the corresponding remote data bus grant (DBG) line 722 low at bus cycle "20" (step 1418). The data bus is available if both the remote data bus 602 going between the memory subsystem and the DSW servicing the destination device, and the local data bus 601 going between the DSW and the destination device, will be available at the time of transmission.

The memory subsystem then re-transmits the data along with the tags to the DSW on remote data bus 602, beginning at bus cycle "22" (step 1419). While transmitting data, the memory subsystem holds a data valid (Dval) and data busy (Dbusy) lines low, releasing Dbusy one cycle before transmission end. The DSW 211 local to the destination device re-transmits the data received to the destination device on local data bus 601, beginning at bus cycle "24" (step 1420). The tag is also repeated each cycle, and DVal and DBusy are held low as before. This completes the write-to-device transaction.

Figure 15:
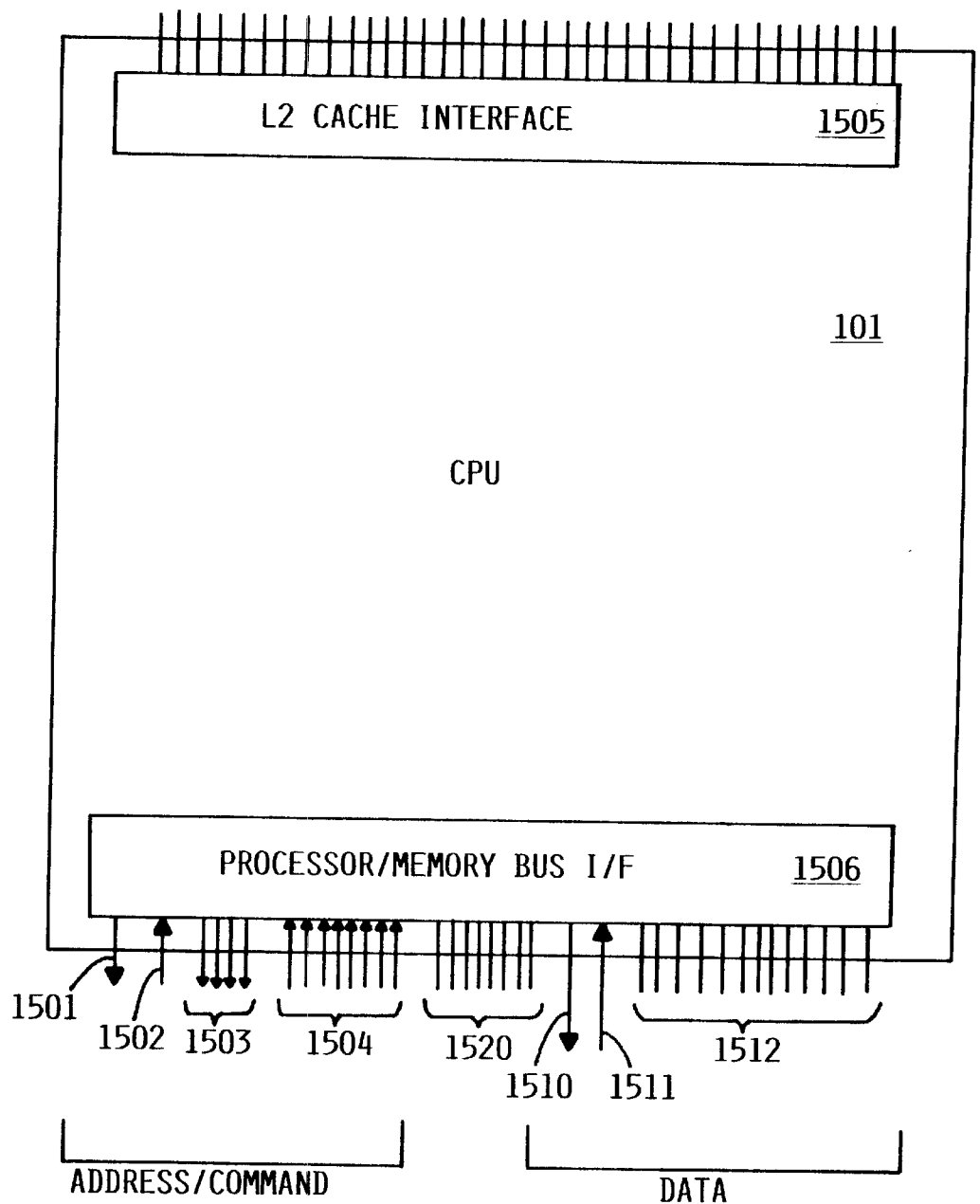
FIG. 15 illustrates a processor chip and its I/O pin requirements at a high level, according to the preferred embodiment.

In the design of processor chips, it is well known that the number of available I/O pins is a severe constraint. The use of a narrower bus for transmitting commands/addresses/tags reduces the number of I/O pins required of a processor chip. FIG. 15 illustrates a processor chip and its I/O pin requirements at a high level. It will be understood that FIG. 15 is a greatly simplified diagram, and that a typical processor will have many components, such as on-board caches, registers, ALUs, instruction decode logic, instruction sequencer, etc., which are not shown. In the preferred embodiment, the chip has approximately 1000 available pins. The processor chip has an on-board L1 cache, but the L2 cache is on a separate chip. Approximately half of the available pins are used by the L2 cache interface 1505. Many remaining pins are required for power, clock, testing, configuration inputs, etc. This leaves a limited number of pins for the processor/memory bus interface 1506. The data bus portion includes data bus request pin 1510, data bus grant pin 1511, the bidirectional data bus itself 1512, and miscellaneous control/steering pins not shown. The address/command bus portion includes command bus request pin 1501 (for driving a request line 701), command bus grant pin 1502 (for receiving a grant line 704), command output pins 1503 (for driving link 301) and command input pins 1504 (for receiving link 304). It also includes miscellaneous status, response and other pins collectively designated 1520. According to the preferred embodiment of the present invention, the number of command output pins 1503 required is approximately half that of the number of command input pins 1504. The number of pins shown in FIG. 15 is intended as a conceptual representation only; the actual number is much greater and would be difficult to illustrate in a single drawing.

The bus architecture described herein facilitates connection to a relatively large number of processors and I/O interface units. In the preferred embodiment, there is an architectural limit of approximately 37 devices, this limit being imposed largely by the number of available I/O pins in the DSW, ASW and ARP chips. However, it will readily be appreciated by those skilled in the art that the architectural concepts explained herein could easily be employed to support larger number of devices, e.g., by using additional switching chips.

In the preferred embodiment, a particular timing sequence is presented. It will readily be understood by those skilled in the art that the timing sequences presented herein are exemplary in nature, and that the architectural concepts explained herein could use different timing sequences, provided the timing sequence protocol is observed by all bus devices. It will further be understood that in some cases there may be a variable delay between the occurrence of certain events which require separate arbitration, and that the timing diagrams presented herein show only one set of examples of such delays.

In the preferred embodiment, certain status and response signals are transmitted, these being divided in two different bus cycles. It would alternatively be possible to combine these responses in a single bus cycle, to transmit other information as part of status/response, to allocated additional bus cycles for status response, etc.

In the preferred embodiment, a "node" is physically packaged as a single electronic circuit card and has multiple chips mounted thereon. However, a node could have different physical embodiments, e.g., as multiple circuit cards in a mother-daughter arrangement, or multiple cards in a special packaging arrangement, or even possibly as a single chip. The significance of the node is that communication within a node is easier than between nodes. A single circuit card was chosen as the node boundary because communication across a card boundary requires connectors, drivers and other hardware to support it, making it desirable to minimize the number of lines crossing the card boundary In the preferred embodiment, certain functions are combined on a single chip or divided among pairs of chips. However, the exact number of chips used to perform functions may vary, and as described herein, devices are grouped by logical function rather than packaging. For example, it may be possible to combine the two DSW chips on a single chip, or even to combing the ARP and DSW chips on a single chip. It may alternatively be possible to implement the ARP as multiple chips. The logic functions required of the ARP, DSW and ASW are far less complex than a single processor chip, but multiple chips are used chiefly to obtain the requisite number of I/O pins.

In the preferred embodiment, the command bus comprises uni-directional links, many of which are point-to-point. It will be appreciated, however, that many variations in type of link are possible. For example, the multiple point-to-point links running from each local ARP to the ASW could alternatively be a single shared unidirectional link from all ARPs (however, in this case, the shared link would have to be full width, since all commands would be transmitted over it).

In the preferred embodiment, only processors, memory, and I/O interface devices are attached to the bus, but it would alternatively be possible to attach other types of devices.

Although a specific embodiment of the invention has been disclosed along with certain alternatives, it will be recognized by those skilled in the art that additional variations in form and detail may be made within the scope of the following claims:

What is claimed is:

1. A multi-processor computer system, comprising:
   a plurality of nodes, each node containing at least one device for transmitting bus communications, at least some of said devices for transmitting bus communications being processors;
   a plurality of first unidirectional command links, each first link communicating from at least one of said devices to an outbound command repeater for the same node as the device;
   a plurality of second unidirectional command links, each second link being associated with a respective node, each second link communicating from the outbound repeater of the node with which it is associated to a central command repeater unit;
   a plurality of third unidirectional command links, each third link being associated with a respective node, each third link communicating from the central command repeater unit to an inbound command repeater of the node with which it is associated; and
   a plurality of fourth unidirectional command links, each fourth link communicating from an inbound command repeater to at least one device in the same node as the inbound command repeater;
   wherein a bus command is transmitted from an originating device on a corresponding first link of said plurality of first links to said outbound command repeater, is repeated from said outbound command repeater on a corresponding second link of said plurality of second links to said central command repeater, is repeated from said central command repeater on each said third link simultaneously to each said inbound command repeater, and is repeated on each said fourth link simultaneously to each said device.

2. The multi-processor computer system of claim 1, wherein said bus command transmitted by said originating device is repeated on said second, third and fourth links a respective predetermined number of bus cycles after being transmitted on said first link.

3. The multi-processor computer system claim 2, wherein said central command repeater unit is capable of broadcasting a new bus command on said third unidirectional command links every bus cycle, whereby a first command is broadcast on said third unidirectional links and a second command is broadcast on said fourth unidirectional links simultaneously in the same bus cycle.

4. The multi-processor computer system of claim 1, further comprising a data bus having an arbitration mechanism, said arbitration mechanism granting to a device the right to transmit data on said data bus independently of first, second, third and fourth command links.

5. The multi-processor computer system claim 1, wherein said bus command includes a tag uniquely identifying the bus command, and wherein said tag is transmitted simultaneously with data responsive to said bus command on said data bus.

6. A method for communicating between devices attached to a communication bus in a computer system, said communication bus including a command portion and a data portion, said method comprising the steps of:
   requesting control of said command portion by a first device attached to said communication bus during a first bus cycle for transmitting a first bus command;
   receiving a grant of control of said command portion by said first device during a second bus cycle;
   transmitting command information for said first bus command on a first link of said command portion from said first device to a repeater unit during a third bus cycle, said third bus cycle occurring a pre-defined number of cycles N after said second bus cycle; and
   re-transmitting said command information for said first bus command on a second link of said command portion from a repeater unit to a second device attached to said communication bus during a fourth bus cycle, said fourth bus cycle occurring a pre-defined number of cycles M after said second bus cycle, wherein M>N.

7. The method of claim 6, further comprising the steps of:
   requesting control of said data portion by said second device during a fifth bus cycle, said fifth bus cycle occurring after said fourth bus cycle, said requesting control of said data portion step being responsive to said first bus command;
   receiving a grant of control of said data portion by said second device during a sixth bus cycle;
   transmitting data on a first link of said data portion from said second device to a repeater unit during a seventh bus cycle, said seventh bus cycle occurring a pre-defined number of cycles after said sixth bus cycle; and
   re-transmitting said data on a second link of said data portion from a repeater unit to first device during an eighth bus cycle, said eighth bus cycle occurring a pre-defined number of cycles after said sixth bus cycle.

8. The method of claim 7, wherein said command information includes a tag uniquely identifying said bus command, and wherein said tag is transmitted simultaneously With said data on said first link of said data portion and on said second link of said data portion.

9. The method of claim 6, wherein said first and second links of said command portion are uni-directional links.

10. The method of claim 6, further comprising the step of:
    requesting control of said command portion by a third device attached to said communication bus for transmitting a second bus command;
    receiving a grant of control of said command portion by said second device during a bus cycle which is N bus cycles before said fourth bus cycle; and
    transmitting command information for said second bus command on a link of said command portion from said third device to a repeater unit during said fourth bus cycle; and
    re-transmitting said command information on said second link of said command portion from a repeater unit to said second device attached to said communication bus during a fifth bus cycle, said fifth bus cycle occurring (M−N) cycles after said fourth bus cycle.

11. A multi-processor computer system, comprising:

a plurality of devices for transmitting bus communications, at least some of said devices for transmitting bus communications being processors;

a communications network for communicating among said devices, said network comprising a command bus and a data bus;

a central arbitrator for said command bus, said central arbitrator granting exclusive control of said command bus to devices attached to said command bus at respective bus cycles; and a plurality of data bus arbitrators, each data bus arbitrator granting exclusive control of a respective portion of said data bus, wherein each portion of said data bus is capable of transferring data from a source device to a destination device concurrently with and independently of every other data bus portion;

wherein said command bus comprises:

(a) a central repeater for broadcasting commands;

(b) a first portion for transmitting commands from originating devices to said central repeater; wherein commands are transmitted on said first portion at first pre-defined bus cycles after said central arbitrator grants control of the command bus to the originating devices; and (c) a second portion for broadcasting commands from said central repeater to all devices attached to said command bus, wherein commands are transmitted on said second portion at second pre-defined bus cycles after said central arbitrator grants control of the command bus to the originating devices, said second pre-defined bus cycles being different from said first pre-defined bus cycles;

wherein a first bus command may be transmitted on said first portion simultaneously with transmitting a second bus command on said second portion.

12. The multi-processor computer system of claim 11, wherein:

said first portion of said command bus comprises a plurality of local uni-directional links running from devices to at least one local repeater unit, and at least one uni-directional link running from the at least one local repeater unit to said central repeater; and said second portion of said command bus comprises at least one unidirectional link running from said central repeater to at least one local repeater, and a plurality of local uni-directional links running from the at least one local repeater to a plurality of devices attached to said command bus.

13. The multi-processor computer system of claim 11, wherein command information associated with each respective bus command includes a corresponding tag uniquely identifying the respective bus command, and wherein said corresponding tag is transmitted simultaneously with data associated with the respective bus command on a first portion of said data bus and on a second portion of said data bus.

14. A multi-processor computer system, comprising:

a plurality of devices for transmitting bus communications, at least some of said devices for transmitting bus communications being processors;

a communications network for communicating among said devices, said network comprising a command bus and a data bus;

a central arbitrator for said command bus, said central arbitrator granting exclusive control of said command bus to devices attached to said command bus at respective bus cycles;

a plurality of data bus arbitrators, each data bus arbitrator granting exclusive control of a respective portion of said data bus, wherein each portion of said data bus is capable of transferring data from a source device to a destination device concurrently with and independently of every other data bus portion; and a response bus for transmitting responses to commands transmitted on said command bus, wherein a corresponding response is transmitted on said response bus in response to a respective command a pre-determined number of bus cycles after said central arbitrator grants control of said command bus to a device to transmit the respective command.

15. The multi-processor computer system of claim 14, wherein command information associated with each respective bus command includes a corresponding tag uniquely identifying the respective bus command, and wherein said corresponding tag is transmitted simultaneously with data associated with the respective bus command on a first portion of said data bus and on a second portion of said data bus.

* * * * *